(12) United States Patent
O'Reilley Stern et al.

(10) Patent No.: US 11,169,615 B2
(45) Date of Patent: Nov. 9, 2021

(54) NOTIFICATION OF AVAILABILITY OF RADAR-BASED INPUT FOR ELECTRONIC DEVICES

(71) Applicant: Google LLC, Mountain View, CA (US)

(72) Inventors: Devon James O'Reilley Stern, Oakland, CA (US); Leonardo Giusti, San Francisco, CA (US); Vignesh Sachidanandam, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/912,307

(22) Filed: Jun. 25, 2020

(65) Prior Publication Data

US 2021/0064142 A1 Mar. 4, 2021

Related U.S. Application Data

(63) Continuation of application No. PCT/US2019/049164, filed on Aug. 30, 2019.

(51) Int. Cl.
*G06F 3/01* (2006.01)
*G01S 13/88* (2006.01)
(Continued)

(52) U.S. Cl.
CPC .............. *G06F 3/017* (2013.01); *G01S 13/88* (2013.01); *G06F 3/0346* (2013.01); *G09G 5/026* (2013.01); *G09G 5/37* (2013.01); *G09G 2354/00* (2013.01)

(58) Field of Classification Search
CPC .... G06F 3/017; G06F 3/0346; G06F 3/04883; G06F 1/3231; G01S 13/88; G01S 13/42;
(Continued)

(56) References Cited

U.S. PATENT DOCUMENTS

| 5,670,987 A | 9/1997 | Koi et al. |
| 6,215,890 B1 | 4/2001 | Matsuo et al. |
| (Continued) | | |

FOREIGN PATENT DOCUMENTS

| CN | 103502911 | 1/2014 |
| CN | 106062777 | 10/2016 |
| (Continued) | | |

OTHER PUBLICATIONS

"Non-Final Office Action", U.S. Appl. No. 16/601,421, dated Oct. 2, 2020, 15 pages.

(Continued)

*Primary Examiner* — David D Davis
(74) *Attorney, Agent, or Firm* — Colby Nipper PLLC

(57) ABSTRACT

This document describes techniques and systems that enable an input-mode notification for a multi-input mode. A radar field enables an electronic device to accurately determine the presence or absence of a user near the electronic device. Further, the electronic device can determine whether an application that can receive input through radar-based gestures is operating on the electronic device. Using these techniques, the electronic device can present an input-mode notification on a display of the electronic device when the user is near to alert the user that radar gesture input is available for interacting with the electronic device. This allows the device to provide the user with feedback that can educate the user about what the electronic device is capable of, and allows the user to take advantage of the additional functionality and features provided by the availability of the radar gestures.

20 Claims, 17 Drawing Sheets

(51) Int. Cl.
    *G06F 3/0346*     (2013.01)
    *G09G 5/02*     (2006.01)
    *G09G 5/37*     (2006.01)

(58) Field of Classification Search
    CPC .......... G01S 7/417; G09G 5/026; G09G 5/37;
                                                  G09G 2354/00
    See application file for complete search history.

(56) References Cited

U.S. PATENT DOCUMENTS

| | | |
|---|---|---|
| 6,727,892 B1 | 4/2004 | Murphy |
| 6,990,335 B1 | 1/2006 | Shamoon et al. |
| 8,237,666 B2 | 8/2012 | Soo et al. |
| 8,373,666 B2 | 2/2013 | Jung et al. |
| 8,508,347 B2 | 8/2013 | Pihlaja |
| 8,659,548 B2 | 2/2014 | Hildreth |
| 9,134,798 B2 | 9/2015 | Morris et al. |
| 9,207,852 B1 | 12/2015 | Zhou et al. |
| 9,575,560 B2 | 2/2017 | Poupyrev et al. |
| 9,629,201 B2 | 4/2017 | Chen et al. |
| 9,921,660 B2 | 3/2018 | Poupyrev |
| 10,061,509 B2 | 8/2018 | Viese et al. |
| 10,088,908 B1 | 10/2018 | Poupyrev et al. |
| 10,101,874 B2 | 10/2018 | Kwon et al. |
| 10,139,916 B2 | 11/2018 | Poupyrev |
| 10,284,541 B1 | 5/2019 | Subramanian et al. |
| 10,300,370 B1 | 5/2019 | Amihood et al. |
| 10,394,333 B2 | 8/2019 | Cheng et al. |
| 2002/0158838 A1 | 10/2002 | Smith et al. |
| 2003/0095154 A1 | 5/2003 | Colmenarez |
| 2003/0122651 A1 | 7/2003 | Doi et al. |
| 2006/0256082 A1* | 11/2006 | Cho .................. G06F 1/1626 |
| | | 345/156 |
| 2008/0178126 A1 | 7/2008 | Beeck et al. |
| 2008/0300055 A1 | 12/2008 | Lutnick et al. |
| 2009/0191968 A1 | 7/2009 | Johnson et al. |
| 2009/0296930 A1 | 12/2009 | Krantz et al. |
| 2010/0192102 A1 | 7/2010 | Chmielewski et al. |
| 2010/0205667 A1 | 8/2010 | Anderson et al. |
| 2010/0306716 A1 | 12/2010 | Perez |
| 2011/0181509 A1* | 7/2011 | Rautiainen ............. G06F 3/017 |
| | | 345/158 |
| 2011/0181510 A1 | 7/2011 | Hakala et al. |
| 2011/0185318 A1 | 7/2011 | Hinckley et al. |
| 2011/0304541 A1 | 12/2011 | Dalal |
| 2011/0310005 A1 | 12/2011 | Chen et al. |
| 2012/0032834 A1 | 2/2012 | Weeks et al. |
| 2012/0110516 A1 | 5/2012 | Tumanov |
| 2012/0131229 A1 | 5/2012 | McCarthy et al. |
| 2012/0185910 A1 | 7/2012 | Miettinen et al. |
| 2012/0194551 A1 | 8/2012 | Osterhout et al. |
| 2012/0214594 A1 | 8/2012 | Kirovski et al. |
| 2012/0229377 A1 | 9/2012 | Kim et al. |
| 2012/0235790 A1 | 9/2012 | Zhao et al. |
| 2012/0280900 A1 | 11/2012 | Wang et al. |
| 2013/0106898 A1 | 5/2013 | Saint-Loubert-Bie et al. |
| 2013/0191791 A1 | 7/2013 | Rydenhag et al. |
| 2013/0316687 A1 | 11/2013 | Subbaramoo et al. |
| 2014/0028539 A1 | 1/2014 | Newham et al. |
| 2014/0118257 A1 | 5/2014 | Baldwin |
| 2014/0124647 A1 | 5/2014 | Hsu |
| 2014/0332441 A1* | 11/2014 | Jayetileke ............ H04B 1/3888 |
| | | 206/774 |
| 2014/0333431 A1* | 11/2014 | Abdelsamie ........ H04M 19/048 |
| | | 340/539.11 |
| 2015/0007049 A1* | 1/2015 | Langlois ............. H04L 12/1895 |
| | | 715/752 |
| 2015/0088283 A1 | 3/2015 | Fiedler et al. |
| 2015/0121108 A1 | 4/2015 | Agrawal et al. |
| 2015/0169071 A1* | 6/2015 | Jitkoff ................. G06F 3/0485 |
| | | 715/863 |
| 2015/0205821 A1 | 7/2015 | Kogan |
| 2015/0212641 A1 | 7/2015 | Tanneberger et al. |
| 2015/0277569 A1 | 10/2015 | Sprenger et al. |
| 2015/0324004 A1 | 11/2015 | Lee et al. |
| 2015/0346820 A1 | 12/2015 | Poupyrev et al. |
| 2015/0362986 A1 | 12/2015 | Lee et al. |
| 2016/0041617 A1 | 2/2016 | Poupyrev |
| 2016/0041618 A1 | 2/2016 | Poupyrev |
| 2016/0054803 A1 | 2/2016 | Poupyrev |
| 2016/0071341 A1 | 3/2016 | Menzel |
| 2016/0073351 A1 | 3/2016 | Cardozo et al. |
| 2016/0098089 A1 | 4/2016 | Poupyrev |
| 2016/0150124 A1 | 5/2016 | Panda et al. |
| 2016/0179205 A1 | 6/2016 | Katz |
| 2016/0187992 A1 | 6/2016 | Yamamoto et al. |
| 2016/0216769 A1 | 7/2016 | Goetz et al. |
| 2016/0252607 A1 | 9/2016 | Saboo et al. |
| 2016/0261760 A1 | 9/2016 | Aso et al. |
| 2016/0275348 A1 | 9/2016 | Slaby et al. |
| 2016/0306491 A1* | 10/2016 | Lee ..................... G06F 3/0416 |
| 2016/0320854 A1 | 11/2016 | Lien et al. |
| 2017/0010658 A1 | 1/2017 | Tanaka et al. |
| 2017/0052618 A1 | 2/2017 | Lee et al. |
| 2017/0097413 A1 | 4/2017 | Gillian et al. |
| 2017/0097684 A1 | 4/2017 | Lien |
| 2017/0115738 A1 | 4/2017 | Wei |
| 2017/0243389 A1 | 8/2017 | Wild et al. |
| 2017/0289766 A1 | 10/2017 | Scott et al. |
| 2017/0358940 A1 | 12/2017 | Parikh et al. |
| 2018/0004301 A1 | 1/2018 | Poupyrev |
| 2018/0040144 A1 | 2/2018 | Li |
| 2018/0043246 A1 | 2/2018 | Chang |
| 2018/0052618 A1* | 2/2018 | Zhu ..................... G06F 3/016 |
| 2018/0082656 A1* | 3/2018 | Ito ...................... G06F 3/0308 |
| 2018/0117447 A1 | 5/2018 | Tran |
| 2018/0157330 A1 | 6/2018 | Gu et al. |
| 2018/0164893 A1 | 6/2018 | Sperrhake et al. |
| 2018/0173323 A1 | 6/2018 | Harvey et al. |
| 2018/0211024 A1 | 7/2018 | Zhao et al. |
| 2018/0329050 A1 | 11/2018 | Amihood et al. |
| 2019/0011993 A1 | 1/2019 | Ette et al. |
| 2019/0079590 A1 | 3/2019 | Tomizawa et al. |
| 2019/0087621 A1 | 3/2019 | Khuri-Yakub et al. |
| 2019/0129520 A1* | 5/2019 | Shin .................... G06F 3/048 |
| 2019/0138109 A1 | 5/2019 | Poupyrev et al. |
| 2019/0187265 A1* | 6/2019 | Barbello .............. G06F 3/017 |
| 2019/0260661 A1 | 8/2019 | Amini et al. |
| 2019/0278339 A1 | 9/2019 | Cooper et al. |
| 2020/0081560 A1 | 3/2020 | Geller et al. |
| 2020/0142645 A1 | 5/2020 | Wibbels et al. |
| 2020/0159897 A1 | 5/2020 | Schmitt et al. |
| 2020/0219338 A1 | 7/2020 | Chen et al. |
| 2020/0372239 A1 | 11/2020 | Schmitt et al. |
| 2020/0410072 A1 | 12/2020 | Giusti et al. |
| 2021/0019441 A1 | 1/2021 | Neves Creto et al. |
| 2021/0025976 A1 | 1/2021 | Alok et al. |
| 2021/0026454 A1 | 1/2021 | Hong et al. |
| 2021/0027049 A1 | 1/2021 | Chandel et al. |
| 2021/0029542 A1 | 1/2021 | Prag et al. |
| 2021/0064143 A1 | 3/2021 | Stern et al. |
| 2021/0064144 A1 | 3/2021 | Stern et al. |
| 2021/0064145 A1 | 3/2021 | Stern et al. |
| 2021/0064146 A1 | 3/2021 | Stern et al. |
| 2021/0103337 A1 | 4/2021 | Jeppsson et al. |
| 2021/0103348 A1 | 4/2021 | Jeppsson et al. |

FOREIGN PATENT DOCUMENTS

| | | |
|---|---|---|
| CN | 106339076 | 1/2017 |
| CN | 106537173 | 3/2017 |
| CN | 107710012 | 2/2018 |
| CN | 108781308 | 11/2018 |
| EP | 2385450 | 11/2011 |
| EP | 3267291 | 1/2018 |
| GB | 2548964 | 10/2017 |
| GB | 2575185 | 1/2020 |
| KR | 20150033182 | 4/2015 |
| WO | 2015196063 | 12/2015 |
| WO | 2016022764 | 2/2016 |
| WO | 2019118017 | 6/2019 |
| WO | 2019206091 | 10/2019 |
| WO | 2020263250 | 12/2020 |

(56) References Cited

FOREIGN PATENT DOCUMENTS

| WO | 2021021218 | 2/2021 |
|---|---|---|
| WO | 2021021219 | 2/2021 |
| WO | 2021021220 | 2/2021 |
| WO | 2021021224 | 2/2021 |
| WO | 2021021227 | 2/2021 |
| WO | 2021040742 | 3/2021 |
| WO | 2021040745 | 3/2021 |
| WO | 2021040747 | 3/2021 |
| WO | 2021040748 | 3/2021 |
| WO | 2021040749 | 3/2021 |

OTHER PUBLICATIONS

"ControlAir on the Mac App Store", retrieved from https://apps.apple.com/om/app/controlair/id950009491 on Jun. 25, 2019, 2 pages.
"Intelligent Rendering of Readable Content onto Display Devices", Published on IP.com on Sep. 21, 2010, Sep. 21, 2010, 4 pages.
"International Search Report and Written Opinion", PCT Application No. PCT/US2019/039306, Mar. 11, 2020, 17 pages.
"International Search Report and Written Opinion", PCT Application No. PCT/US2019/049208, Mar. 26, 2020, 13 pages.
"International Search Report and Written Opinion", PCT Application No. PCT/US2019/049212, Mar. 20, 2020, 14 pages.
"International Search Report and Written Opinion", PCT Application No. PCT/US2019/053676, Apr. 2, 2020, 14 pages.
"International Search Report and Written Opinion", PCT Application No. PCT/US2019/049233, Apr. 20, 2020, 19 pages.
"International Search Report and Written Opinion", PCT Application No. PCT/US2019/049236, May 26, 2020, 17 pages.
"International Search Report and Written Opinion", PCT Application No. PCT/US2019/049204, May 4, 2020, 15 pages.
"International Search Report and Written Opinion", PCT Application No. PCT/US2019/049164, May 6, 2020, 14 pages.
"International Search Report and Written Opinion", PCT Application No. PCT/US2019/049225, May 6, 2020, 15 pages.
Aboussouan, "Super-Resolution Image Construction Using an Array Camera", Technical Disclosure Commons; Retrieved from http://www.tdcommons.org/dpubs_series/643, Aug. 18, 2017, 7 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
Bardram, et al., "Context-Aware User Authentication—Supporting Proximity-Based Login in Pervasive Computing", Centre for Pervasive Computing; Department of Computer Science, University of Aarhus; A.K. Dey et al. (Eds.): UbiComp 2003, LNCS 2864; ©Springer-Verlag Berlin Heidelberg, 2003, pp. 107-123.
Colgan, "How Does the Leap Motion Controller Work?", Retrieved from http://blog.leapmotion.com/hardware-to-software-how-does-the-leap-motion-controller-work/ on Jun. 25, 2019, Aug. 9, 2014, 10 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.
Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
Oh, et al., "Gesture Sensor for Mobile Devices", Samsung Electronics Co., Ltd; White Paper, 2013, 12 pages.
"International Search Report and Written Opinion", PCT Application No. PCT/US2019/055731, Mar. 26, 2020, 15 pages.
"International Search Report and Written Opinion", PCT Application No. PCT/US2019/049216, Apr. 2, 2020, 14 pages.
"Final Office Action", U.S. Appl. No. 16/601,421, dated Mar. 30, 2021, 17 pages.
"Foreign Office Action", KR Application No. 10-2019-0157391, dated Jan. 29, 2021, 8 pages.
"Foreign Office Action", KR Application No. 10-2019-0157394, dated Mar. 25, 2021, 10 pages.
"Non-Final Office Action", U.S. Appl. No. 16/601,452, dated Mar. 24, 2021, 13 pages.
"Non-Final Office Action", U.S. Appl. No. 16/912,373, dated Apr. 1, 2021, 15 pages.
"Non-Final Office Action", U.S. Appl. No. 16/871,945, dated May 7, 2021, 41 pages.
"Non-Final Office Action", U.S. Appl. No. 16/871,945, dated Mar. 8, 2021, 41 pages.
Poupyrev, "Welcome to Project Soli—Youtube", Retrieved at: https://www.youtube.com/watch?v=0QNiZfSsPc0, May 29, 2015, 1 page.
Yeeun, "Brain Out—Blog", Retrieved at: https://blog.naver.com/junye2147/221658923923, Sep. 25, 2019, 29 pages.
"Final Office Action", U.S. Appl. No. 16/871,945, dated Aug. 25, 2021, 46 pages.
"Foreign Office Action", CN Application No. 201980006096.3, dated Jul. 14, 2021, 18 pages.
"Foreign Office Action", KR Application No. 10-2019-0157391, dated Jul. 29, 2021, 9 pages.
"Non-Final Office Action", U.S. Appl. No. 16/912,635, dated Jun. 11, 2021, 14 pages.
"Notice of Allowance", U.S. Appl. No. 16/912,635, dated Aug. 19, 2021, 7 pages.
Park, "Development of Kinect-Based Pose Recognition Model for Exercise Game", May 2016, pp. 303-310.
"Non-Final Office Action", U.S. Appl. No. 16/601,421, dated Sep. 14, 2021, 29 pages.
"Non-Final Office Action", U.S. Appl. No. 16/879,662, dated Sep. 16, 2021, 12 pages.

* cited by examiner

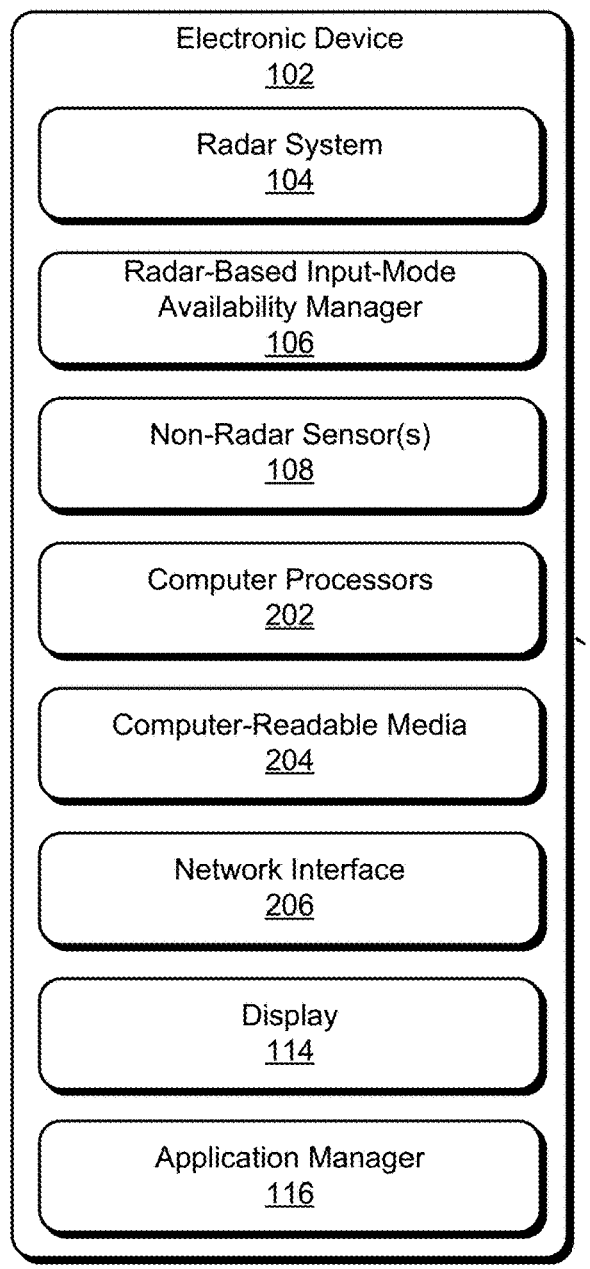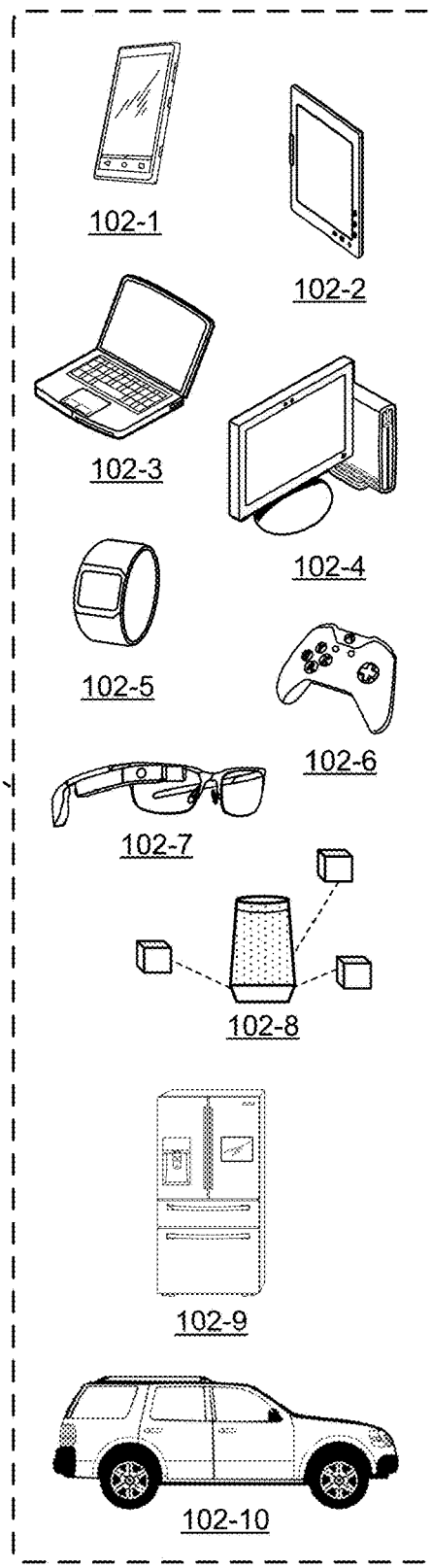
FIG. 2

NOTIFICATION OF AVAILABILITY OF RADAR-BASED INPUT FOR ELECTRONIC DEVICES

RELATED APPLICATIONS

This application is a continuation application of International Application No. PCT/US2019/049164, filed Aug. 30, 2019, and titled "Input-Mode Notification for a Multi-Input Mode," the disclosure of which is incorporated in its entirety by reference herein.

BACKGROUND

Electronic devices are regularly relied upon for both business and personal use. Users communicate with them via voice and touch, and treat them like a virtual assistant to schedule meetings and events, consume digital media, and share presentations and documents. One important part of effective communication is feedback so that the user knows the message has been received. Many conventional electronic devices provide audio or physical feedback, such as a beep or vibration, when the user makes a touch input or speaks a voice command. This feedback gives the user confidence that the user's input has been received or alerts the user that the input was unsuccessful. Further, some electronic devices provide markers to tell the user how to make an input, such as a keyboard or microphone icon to let the user know how to access touch or voice input modes.

With the aid of machine-learning techniques, the electronic devices can become familiar with the user's routines and preferences and can operate in a mode likely to be preferred by the user. For all this computing power and artificial intelligence, however, these devices are still reactive communicators. That is, however "smart" a smartphone is, and however much the user talks to it like it is a person, the electronic device is still dependent on being activated before it can provide any feedback. To activate the mobile device, the user typically has to first pick up the device to make it aware of the user's intention to use the electronic device. Only after this physical interaction can the device make applications and functionality available for the user. Consequently, many electronic devices provide poor user experiences prior to explicit interaction by the user.

SUMMARY

This document describes techniques and systems that enable an input-mode notification for a multi-input mode. The techniques and systems use a radar field to enable an electronic device to accurately determine the presence or absence of a user near the electronic device. Further, the electronic device can determine whether an application that can receive input through radar-based three-dimensional (3D) gestures (radar gestures) is operating on the electronic device. Using these techniques, the electronic device can present an input-mode notification on a display of the electronic device when the user is near. This alerts the user that radar gesture input is available for interacting with the electronic device. This allows the device to provide the user with feedback, which can educate the user about what the electronic device is capable of and allow the user to take advantage of the additional functionality and features provided by the availability of the radar gesture.

Aspects described below include an electronic device comprising a display, a radar system, one or more computer processors, and one or more computer-readable media. The radar system is implemented at least partially in hardware and provides a radar field. The radar system also senses reflections from a user in the radar field, analyzes the reflections from the user in the radar field, and provides radar data based on the analysis of the reflections. The one or more computer-readable media include stored instructions that can be executed by the one or more computer processors to implement a radar-based input-mode availability manager. The radar-based input-mode availability manager determines that an application operating on the electronic device has a capability to receive radar gesture input. The radar-based input-mode availability manager also determines that the user is within a threshold distance of the electronic device. In response to the determination that the application operating on the electronic device has the capability to receive radar gesture input and that the user is within the threshold distance of the electronic device, the radar-based input-mode availability manager causes the display to present an input-mode notification, the input-mode notification associated with the capability to receive the radar gesture input.

Aspects described below also include a method implemented in an electronic device that includes a display and a radar system. The method comprises determining that an application operating on the electronic device has a capability to receive radar gesture input, which is defined by radar data that is generated by the radar system. The method also includes determining, based on one or more subsets of the radar data, that a user is within a threshold distance of the electronic device. The method further includes, in response to determining that the application operating on the electronic device has the capability to receive radar gesture input and that the user is within the threshold distance of the electronic device, providing an input-mode notification on the display of the electronic device, the input-mode notification associated with the capability to receive the radar gesture input.

Aspects described below include a system comprising a display, and an electronic device that includes, or is associated with means for providing a radar field that provides radar data, the radar data based on sensing and analyzing reflections from an object in the radar field. The system also includes means for determining that an application operating on the electronic device has a capability to receive radar gesture input. The system also includes means for determining, based on one or more subsets of the radar data, that a user is within a threshold distance of the electronic device. The system further includes means for providing, in response to determining that the application operating on the electronic device has the capability to receive radar gesture input and that the user is within the threshold distance of the electronic device, an input-mode notification on the display of the electronic device the input-mode notification associated with the capability to receive the radar gesture input.

This summary is provided to introduce simplified concepts concerning the input-mode notification for a multi-input mode, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of an input-mode notification for a multi-input mode are described in this document with reference to the following drawings. The same numbers are used throughout the drawings to reference like features and components:

FIG. 2 illustrates an example implementation of an electronic device, including a radar system, that can implement the input-mode notification for a multi-input mode.

DETAILED DESCRIPTION

Overview

Figure 1:
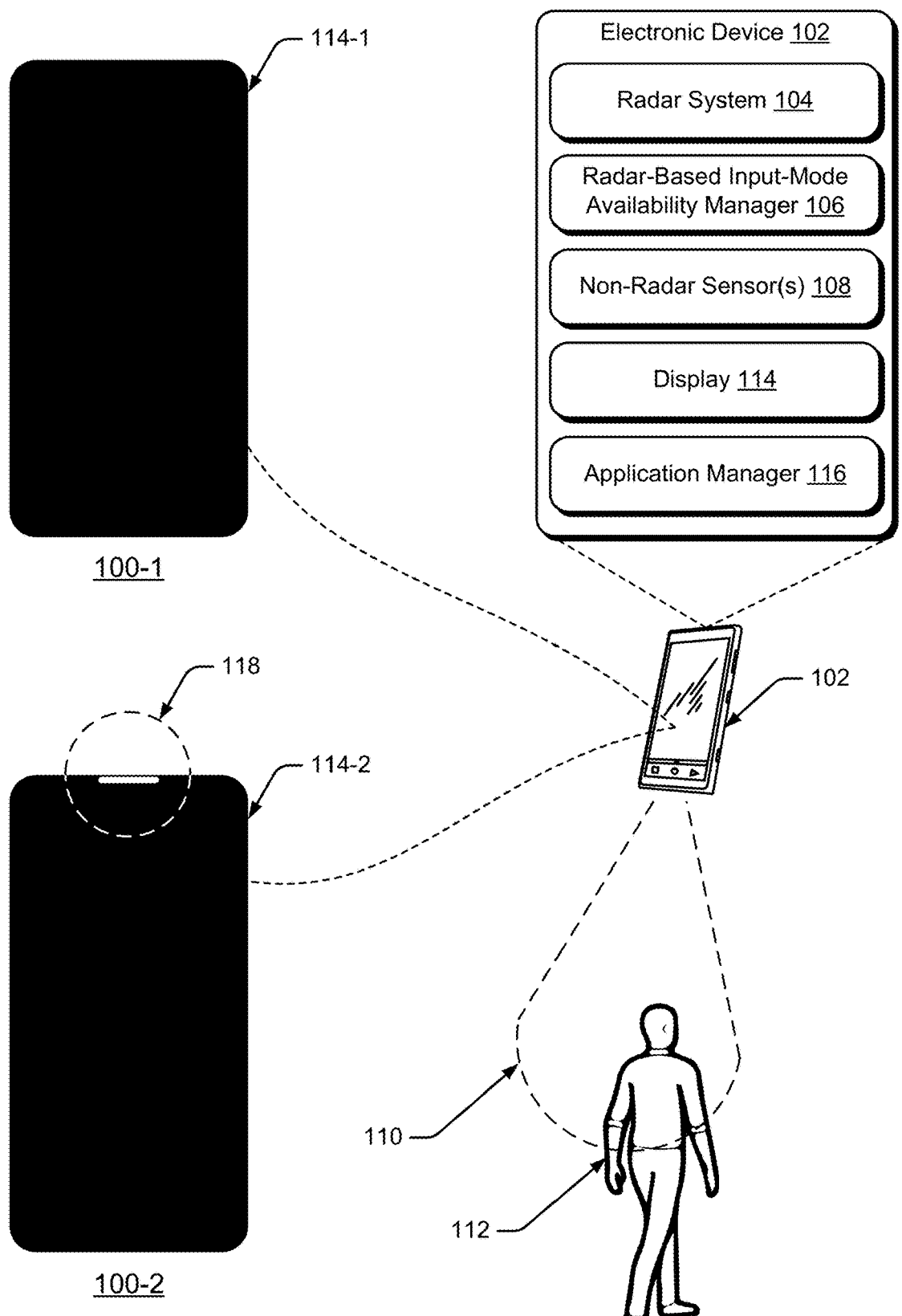
FIG. 1 illustrates an example environment in which techniques enabling the input-mode notification for a multi-input mode can be implemented.

This document describes techniques and systems that enable an input-mode notification for a multi-input mode. As noted, effective communication includes feedback so that the user knows when a message has been sent or received. In the context of communication that is interaction with an electronic device, this can also include understanding what modes of interactions are available. Without an awareness of a user, the electronic device either provides feedback all of the time, which can waste resources, or only after the user explicitly engages, which can adversely affect the user's experience.

The described techniques employ a radar system that can determine the user's presence (or absence) and location relative to the electronic device. The electronic device can also determine when the device is running an application that can receive input through radar-based three-dimensional (3D) gestures (radar gestures). Note that the term "three-dimensional" refers to the nature of a gesture in space, away from the electronic device (e.g., the radar gesture does not require the user to touch the device, though it must be within a threshold distance of the device to be detected by the radar system). The radar gesture itself may often only have an active informational component that lies in two dimensions, such as a radar gesture consisting of an upper-left-to-lower-right swipe in a plane, but because the radar gesture also has a distance from the electronic device (a "third" dimension), the radar gestures discussed herein can be generally be considered three-dimensional.

Using these techniques, the electronic device can provide feedback and a notification to make the user aware of the available radar gesture input mode and, in some cases, provide feedback regarding the use and results of the radar gesture input. A determination of the user's absence, presence, and location can also be used to provide a more-responsive and more-efficient authentication process. For example, the techniques enable the device to anticipate when the user is ready to be authenticated and to more-accurately determine when to lock the device when the user is away. Because the described techniques allow the electronic device to provide the user with useful feedback about available input modes, interactions may be more convenient and less frustrating because the user is aware of the input modes and can be confident about different ways in which the device can interact and receive input.

Consider an example smartphone that includes the described radar system and other components. In this example, an application that has a capability to receive input through radar gestures is operating on the electronic device. This type of application will be referred to as a radar-gesture-subscribed application or a gesture-subscribed application. Examples of gesture-subscribed applications include music players, media players, and applications or features of an electronic device that provide alerts or a reminder, such as a calendar. An input-mode availability manager causes the electronic device to present an input-mode notification on a display of the device when the user is near. For example, the input-mode availability manager can use radar data to determine that the user is within a threshold distance from the electronic device. The threshold distance can be any suitable distance within which the radar system can recognize the user, such as within one, three, five, or seven feet.

The input-mode notification is a user-perceivable element, such as a visual element that is presented on the display of the electronic device that indicates the availability of the application to receive input by radar gestures. For example, when a gesture-subscribed application is running on the electronic device, the display may present an icon, a contrasted lighting area (e.g., an area that is brighter or dimmer than the surrounding area), or an area of different or contrasting color. In some cases, the input-mode notification may be a combination of one or more of these features. Thus, in this example, when the electronic device determines that a gesture-subscribed application is running while the user is near, an illuminated line may appear at the top edge of the display and then slightly dim and remain at the top of the display.

The described techniques and systems employ a radar system, along with other features, to provide a useful and rewarding user experience that changes based on the user's presence or absence and the operation of a gesture-subscribed application on the electronic device. Rather than relying only on the user's knowledge and explicit user input, the electronic device can provide feedback to the user to indicate that the device is aware of the user's location and alert the user to the features and functionality that is available.

Some conventional electronic devices may include sensors, such as cameras, proximity sensors (e.g., capacitive or infra-red sensors), or accelerometers to determine the location of the user and adjust various functions of the electronic device based on the proximity of the user. For example, the electronic device may provide additional privacy or aesthetic value by turning off a display unless the user is within a predetermined distance. The conventional electronic device, however, typically cannot provide a useful and rich ambient experience that can educate the user about the capabilities of the electronic device. These are but a few examples of how the described techniques and devices may be used to enable an input-mode notification for a multi-input mode. Other examples and implementations of which are described throughout this document. The document now turns to an example operating environment, after which example devices, methods, and systems are described.

Operating Environment

FIG. 1 illustrates an example environment 100 in which techniques enabling an input-mode notification for a multi-input mode can be implemented. The example environment 100 includes an electronic device 102, which includes, or is associated with, a radar system 104, a persistent radar-based input-mode availability manager 106 (IMA manager 106), and, optionally, one or more non-radar sensors 108 (non-radar sensor 108). The term "persistent," with reference to the radar system 104 or the IMA manager 106, means that no user interaction is required to activate the radar system 104 (which may operate in various modes, such as a dormant mode, an engaged mode, or an active mode) or the IMA manager 106. In some implementations, the "persistent" state may be paused or turned off (e.g., by a user). In other implementations, the "persistent" state may be scheduled or otherwise managed in accordance with one or more parameters of the electronic device 102 (or another electronic device). For example, the user may schedule the "persistent" state such that it is only operational during daylight hours, even though the electronic device 102 is on both at night and during the day. The non-radar sensor 108 can be any of a variety of devices, such as an audio sensor (e.g., a microphone), a touch-input sensor (e.g., a touchscreen), or an image-capture device (e.g., a camera or video-camera).

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar field 110 may be configured in multiple shapes, such as a sphere, a hemisphere, an ellipsoid, a cone, one or more lobes, or an asymmetric shape (e.g., that can cover an area on either side of an obstruction that is not penetrable by radar). The radar system 104 also enables the electronic device 102, or another electronic device, to sense and analyze reflections from an object in the radar field 110. Some implementations of the radar system 104 are particularly advantageous as applied in the context of smartphones, such as the electronic device 102, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the implementations are particularly advantageous in the described context of the smartphone for which fine radar-detected hand gestures are required, it is to be appreciated that the applicability of the features and advantages of the present invention is not necessarily so limited, and other implementations involving other types of electronic devices (e.g., as described with reference to FIG. 2) are also within the scope of the present teachings.

The object may be any of a variety of objects from which the radar system 104 can sense and analyze radar reflections, such as wood, plastic, metal, fabric, a human body, or human body parts (e.g., a foot, hand, or finger of a user of the electronic device 102). As shown in FIG. 1, the object is a user 112 of the electronic device 102. Based on the analysis of the reflections, the radar system 104 can provide radar data that includes various types of information associated with the radar field 110 and the reflections from the user 112, as described with reference to FIGS. 3-6 (e.g., the radar system 104 can pass the radar data to other entities, such as the IMA manager 106).

It should be noted that the radar data may be continuously or periodically provided over time, based on the sensed and analyzed reflections from the user 112 in the radar field 110. A position of the user 112 can change over time (e.g., the user 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth. In some cases, different subsets of the radar data may overlap, entirely or in part (e.g., one subset of the radar data may include some or nearly all of the same data as another subset).

The electronic device 102 can also include a display 114 and an application manager 116. The display 114 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth. The display 114 is used to display visual elements that are associated with various modes of the electronic device 102, which are described in further detail herein with reference to FIGS. 10-16. The application manager 116 can communicate and interact with applications operating on the electronic device 102 to determine and resolve conflicts between applications (e.g., processor resource usage, power usage, or access to other components of the electronic device 102). The application manager 116 can also interact with applications to determine the applications' available input modes, such as touch, voice, or radar gesture, and communicate the available modes to the IMA manager 106.

The IMA manager 106 can be used to interact with or control various components of the electronic device 102 (e.g., modules, managers, systems, interfaces, or one or more of the non-radar sensors 108). For instance, the IMA manager 106 (independently or through the application manager 116) can determine that an application operating on the electronic device has a capability to receive radar gesture input (e.g., a gesture-subscribed application). The radar gesture input may be based on the radar data and received through the radar system 104. The IMA manager 106, or the radar system 104, can also use the radar data to determine that the user 112 is near the electronic device 102. For example, the IMA manager 106 can determine that the user 112 is within a threshold distance of the electronic device 102, such as within one, three, five, or seven feet of the electronic device 102 or within a recognition zone.

The recognition zone is an area around the radar system 104 that may extend any of a variety of distances from the radar system 104, such as approximately three, seven, ten, or fourteen feet (or approximately one, two, three, or four meters). The recognition zone may be the same or less than a maximum extent of the radar field 110. The recognition zone may be a static size or shape that is predefined, user-selectable, or determined via another method (e.g., based on power requirements, remaining battery life, or another factor). In some cases, the recognition zone may be dynamically and automatically adjustable by the IMA manager 106, based on factors such as the velocity or location of the electronic device 102, a time of day, a state of an application running on the electronic device 102, or another factor. The threshold distance or recognition zone can be determined based on a number of relevant factors, such as battery level, location of the electronic device, velocity of the electronic device, or data received from one or more of the radar system, other sensors, or applications running on the electronic device.

When the IMA 106 determines that the gesture-subscribed application is operating on the electronic device and that the user is near the electronic device 102, the IMA manager 106 can cause the display 114 to present an input-mode notification 118, which is associated with the capability to receive radar gesture input. The input-mode notification 118 is a user-perceivable element, such as a visual element that appears on an active area of the display 114 to indicate that the user 112 may use radar gestures to interact with the gesture-subscribed application. The input-mode notification 118 can also be (or include) a light element that is not on the display (e.g., a light-emitting diode (LED) or an LED array mounted on a housing or bezel of the electronic device), a haptic element (e.g., a vibration element), and/or an audio element (e.g., a user-perceivable sound). The input-mode notification 118 may be presented along an edge of the display 114 and have any of a variety of shapes, sizes, colors, and other visual parameters or properties. Examples of the other visual parameters or properties include luminosity, color, contrast, shape, saturation, blur, or opaqueness. In some cases, the visual element may be a portion of the active area of the display 114 that has a luminosity or other visual property that is different from a luminosity or other visual property of the display 114, has a side that is parallel and/or adjacent to the edge of the active area of the display, and has a shape that extends from the edge of the active area of the display. Luminosity refers to the perceived brightness of an object by a human. Modifying the luminosity may include modifying luminance (e.g., brightness), contrast, and/or opaqueness. While some of these examples describe the input-mode notification 118 as presented on an edge of the display 114, the input-mode notification 118 may appear at a location on the display 114 that is not an edge. For example, the edge of the display 114 may include an area beginning at a border of the active area of the display 114 and extending a distance from the border that is no more than approximately 15 percent of a total length of the border of the display 114.

Consider an example illustrated in FIG. 1. A detail view 100-1 shows an example display 114-1 that is blank. In this example, the blank display 114-1 indicates that the IMA manager 106 has determined that the user 112 is not near the electronic device 102 and/or that no gesture-subscribed application is operating on the electronic device 102. Another detail view 100-2 shows another example display 114-2, on which the input-mode notification 118 is presented. The presentation of the input-mode notification 118 indicates that the IMA manager 106 has determined that the user 112 is near the electronic device 102 (e.g., the user 112 is within the radar field 110 and the IMA manager 106 has used one or more subsets of radar data to determine that the user 112 is within a threshold distance of the electronic device 102) and at least one gesture-subscribed application is operating on the electronic device 102. In this example, the input-mode notification 118 is a line that is located at a top edge of the electronic device 102. In other implementations, the input-mode notification 118 may be another size, another shape, or be presented at another location. Additional details and examples of the input-mode notification 118 are described with reference to FIGS. 8-13.

In some implementations, the luminosity (or other visual parameter) of the input-mode notification 118 may vary as the shape extends across a distance from the edge of the active area of the display 114 (e.g., a maximum luminosity at the edge of the display 114 that decreases as the shape extends away from the edge). For example, the input-mode notification 118 may be presented as a predetermined area of the display 114 that has a different luminosity than another area of the display 114 (e.g., an area surrounding or near to the input-mode notification 118) and that is adjacent to the edge of the display 114. In another example, the input-mode notification 118 may be presented as a line, with a predetermined thickness, that has a different luminosity than the display 114 and that is adjacent to the edge of the display 114.

The color of the input-mode notification 118 may be any suitable color that can be visually differentiated from the background of the display 114 on which it is presented. The color of the input-mode notification 118 may change based on any of a variety of factors, such as an operational state of the electronic device 102 or an ambient background color of the display 114. In some implementations, the IMA manager 106 can determine a background color of a region of the display 114 on which the input-mode notification 118 is, or will be, displayed. In response to determining the background color, the IMA manager 106 can cause the display 114 to present the input-mode notification 118 in another color that is different from the background color. The different color of the input-mode notification 118 can provide human-discernable contrast between the input-mode notification 118 and the background color to make it easier for the user 112 to see the input-mode notification 118. In some cases, the IMA manager 106 can continuously, automatically, and dynamically adjust the color of the input-mode notification 118, based on changes to the background color.

The input-mode notification 118, in some implementations, may appear, at least in part, as a brief animation. For example, the input-mode notification 118 may appear at the edge of the active display and then grow or shrink before taking on a default appearance. Similarly, the color, luminosity, or shape may change as the input-mode notification 118 appears or disappears (e.g., if the gesture-subscribed application stops operating) before taking on the default appearance.

In some cases, the input-mode notification 118 may be an image that appears on the display 114, rather than an element that appears in a region of the display 114. The image may have visual parameters or properties that are different from the parameters or properties of an ambient background of the display 114, such as luminosity, color, contrast, shape, saturation, blur, opaqueness, and so forth. In other cases, the ambient background may be an image, and the input-mode notification 118 is the same image, with different visual parameters, such as luminosity, color, contrast, shape, saturation, blur, opaqueness, and so forth. In this way, the input-mode notification 118 can improve the user's experience by communicating to the user that the electronic device is operating in a mode in which radar gestures are available for interacting with the electronic device 102.

In some implementations, the location of the input-mode notification 118 may be determined based on an orientation of content on the display 114. For example, the IMA manager 106 may obtain the orientation of the content on the display 114 from the application manager 116 (or from another source). The IMA manager 106 can also determine, based on the orientation of the content, a direction of the radar gesture input that can be used to interact with the content. Based on the direction of the radar gesture input, the IMA manager 106 can cause the display to present the input-mode notification 118 at a particular edge of the active area of the display 114 that corresponds to the direction of the radar gesture input. Thus, if the context of the displayed content is horizontal (e.g., the direction of the radar gestures would likely be left-to-right or right-to-left), the input-mode notification 118 is displayed at a top or bottom edge, to help indicate to the user that the radar gestures are horizontal. Similarly, if the context of the displayed content is vertical (e.g., the direction of the radar gestures would likely be bottom-to-top or top-to-bottom), the input-mode notification 118 is displayed at a side edge, to help indicate to the user that the radar gestures are vertical.

Further, the IMA manager 106 may also be able to detect a change in an orientation of the electronic device 102 with respect to the user 112. For example, the user 112 may rotate the device from a vertical to a horizontal orientation to watch a video or from a horizontal to a vertical orientation to read an article. Based on the change in orientation, the IMA manager 106 can cause the display 114 to present the input-mode notification 118 on a different edge of the active display. This different edge can maintain an orientation and location of the input-mode notification 118 with respect to the user 112 (e.g., the input-mode notification 118 moves or relocates as the orientation of the user to the device changes). Thus, if the input-mode notification 118 is positioned on a top edge of the display 114 and the user 112 rotates the electronic device 102, the location of the input-mode notification 118 changes from one edge to another so that it remains on "top" with reference to the user 112. As noted, the IMA manager 106 also takes into account the orientation of the content, and these features can be used in conjunction with each other to present the input-mode notification 118 on the display 114 at the location appropriate for the orientation of both the content on the display 114 and the orientation of the display 114 with respect to the user 112.

In some implementations, the IMA manager 106 can determine that the gesture-subscribed application that is operating on the electronic device 102 is operating in an immersive mode, such as a full-screen mode without any presented controls. In response to this determination, the IMA manager can cause the display 114 to periodically present the input-mode notification 118. For example, the display 114 can present the input-mode notification 118 for a presentation time duration and then stop presenting the input-mode notification 118 for a non-presentation time duration. Both the presentation time duration and the non-presentation time duration may be predetermined or selectable. In some cases, the time durations may be user-selectable (e.g., by the user 112) or selected by the IMA manager 106 based on various factors, such as the type of gesture-subscribed application running in the immersive mode (e.g., a game or a streaming media player), the status of the gesture-subscribed application, or the frequency with which the user employs a radar gesture.

In some implementations, the input-mode notification 118 may fade or disappear entirely when the user 112 interacts with the electronic device 102 using input other than a radar gesture (e.g., a touch or voice input). For example, while a gesture-subscribed application is operating on the electronic device 102, the user may decide to start another application using a touch command, press a power actuator, or press a lock control (or button). In this case, the input-mode notification 118 may fade or disappear when the user picks up the electronic device 102 or touches the display 114. When the user stops touching the display 114 or puts down the electronic device 102, the input-mode notification 118 reappears (or brightens) if one or more gesture-subscribed applications are operating on the electronic device 102. The input-mode notification 118 may reappear or brighten immediately when the touch or voice input ends, or after a selectable time duration. Similarly, when the gesture-subscribed application is an application that provides an alert or notification, the input-mode notification 118 appears when an alert or notification is displayed, such as when a calendar reminder is displayed. When the user 112 interacts with the alert or notification using a radar gesture (e.g., dismisses or resets the alert or notification), the input-mode notification 118 disappears, unless other gesture-subscribed apps are running.

The input-mode notification 118 may be presented while the electronic device 102 is in a locked state or an unlocked state. For example, the electronic device 102 may present the input-mode notification 118 (to indicate that a gesture-subscribed application is running) when a user is nearby (e.g., within the threshold distance), but not authenticated, or when an authenticated user is nearby. The locked and unlocked states refer to a level of access to the electronic device 102. A locked state may be a state in which no user in authenticated and anyone using the device will have less than full rights or access (e.g., no access or rights, or limited access or rights). Examples of the locked state may include the aware and engaged modes of the electronic device 102 as described herein. Similarly, an unlocked state can be a state in which at least one user is authenticated and that user has full rights and/or access to the device. An example of the unlocked state is the active mode of the electronic device 102, as described herein. In some cases, the locked or unlocked state may have varying characteristics, depending on the type, configuration, or status (e.g., a battery level or a connectivity status) of the electronic device 102. Accordingly, characteristics of the locked and unlocked states for different devices or for the same device in different contexts may overlap, or include similar features, depending on those factors.

Additionally or alternatively, the IMA manager 106 may cause the display 114 to present or not present the input-mode notification 118, based on an operational state, a screen state, a power state, or a functional mode of the electronic device 102, such as the dormant mode, aware mode, engaged mode, or the active mode. For example, in the dormant mode or another mode or state in which the user may interact with the electronic device less frequently, or in which the input-mode notification 118 will be presented for longer durations without changing or being hidden, there is an increased risk of screen burn-in (e.g., leaving a ghost image where the input-mode notification 118 is presented because infrequent interaction means the input-mode notification 118 remains in the same place). In these situations, the input-mode notification 118 may be presented at a location that changes over time (e.g., the location shifts over time to avoid being presented at one location for long periods of time).

In some cases, the input-mode notification 118 may also or instead be presented and hidden in intervals that can help prevent screen burn-in. The intervals may be any appropriate duration for the type of display, such as one second, three seconds, five seconds, and so forth. Similarly, when the electronic device 102 is in a mode or state in which there is frequent interaction of different types or modes (e.g., touch, voice, and radar gesture), the input-mode notification 118 may be presented for longer durations because there is less risk of screen burn in because the user's interactions inherently cause the IMA manager 106 to show and hide the input-mode notification 118.

In more detail, consider FIG. 2, which illustrates an example implementation 200 of the electronic device 102 (including the radar system 104, the IMA manager 106, the non-radar sensor 108, the display 114, and the application manager 116) that can implement input-mode notification for a multi-input mode. The electronic device 102 of FIG. 2 is illustrated with a variety of example devices, including a smartphone 102-1, a tablet 102-2, a laptop 102-3, a desktop computer 102-4, a computing watch 102-5, a gaming system 102-6, computing spectacles 102-7, a home-automation and control system 102-8, a smart refrigerator 102-9, and an automobile 102-10. The electronic device 102 can also include other devices, such as televisions, entertainment systems, audio systems, drones, track pads, drawing pads, netbooks, e-readers, home security systems, and other home appliances. Note that the electronic device 102 can be wearable, non-wearable but mobile, or relatively immobile (e.g., desktops and appliances).

In some implementations, exemplary overall lateral dimensions of the electronic device 102 can be approximately eight centimeters by approximately fifteen centimeters. Exemplary footprints of the radar system 104 can be even more limited, such as approximately four millimeters by six millimeters with antennas included. This requirement for such a limited footprint for the radar system 104 is to accommodate the many other desirable features of the electronic device 102 in such a space-limited package (e.g., a fingerprint sensor, the non-radar sensor 108, and so forth). Combined with power and processing limitations, this size requirement can lead to compromises in the accuracy and efficacy of radar gesture detection, at least some of which can be overcome in view of the teachings herein.

The electronic device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. For example, the processors 202 can be used execute instructions on the computer-readable media 204 to implement the radar-based input-mode availability manager 106 and/or the application manager 116. The electronic device 102 may also include a network interface 206. The electronic device 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 can operate as a monostatic radar by transmitting and receiving its own radar signals.

In some implementations, the radar system 104 may also cooperate with other radar systems 104 that are within an external environment to implement a bistatic radar, a multistatic radar, or a network radar. Constraints or limitations of the electronic device 102, however, may impact a design of the radar system 104. The electronic device 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 and the IMA manager 106 are illustrated as part of the electronic device 102. In other implementations, either or both of the radar system 104 and the IMA manager 106 may be separate or remote from the electronic device 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 16 illustrate some of many possible environments and devices capable of employing the described techniques. FIGS. 3-6 describe additional details and features of the radar system 104. In FIGS. 3-6, the radar system 104 is described in the context of the electronic device 102, but as noted above, the applicability of the features and advantages of the described systems and techniques are not necessarily so limited, and other implementations involving other types of electronic devices may also be within the scope of the present teachings.

Figure 3:
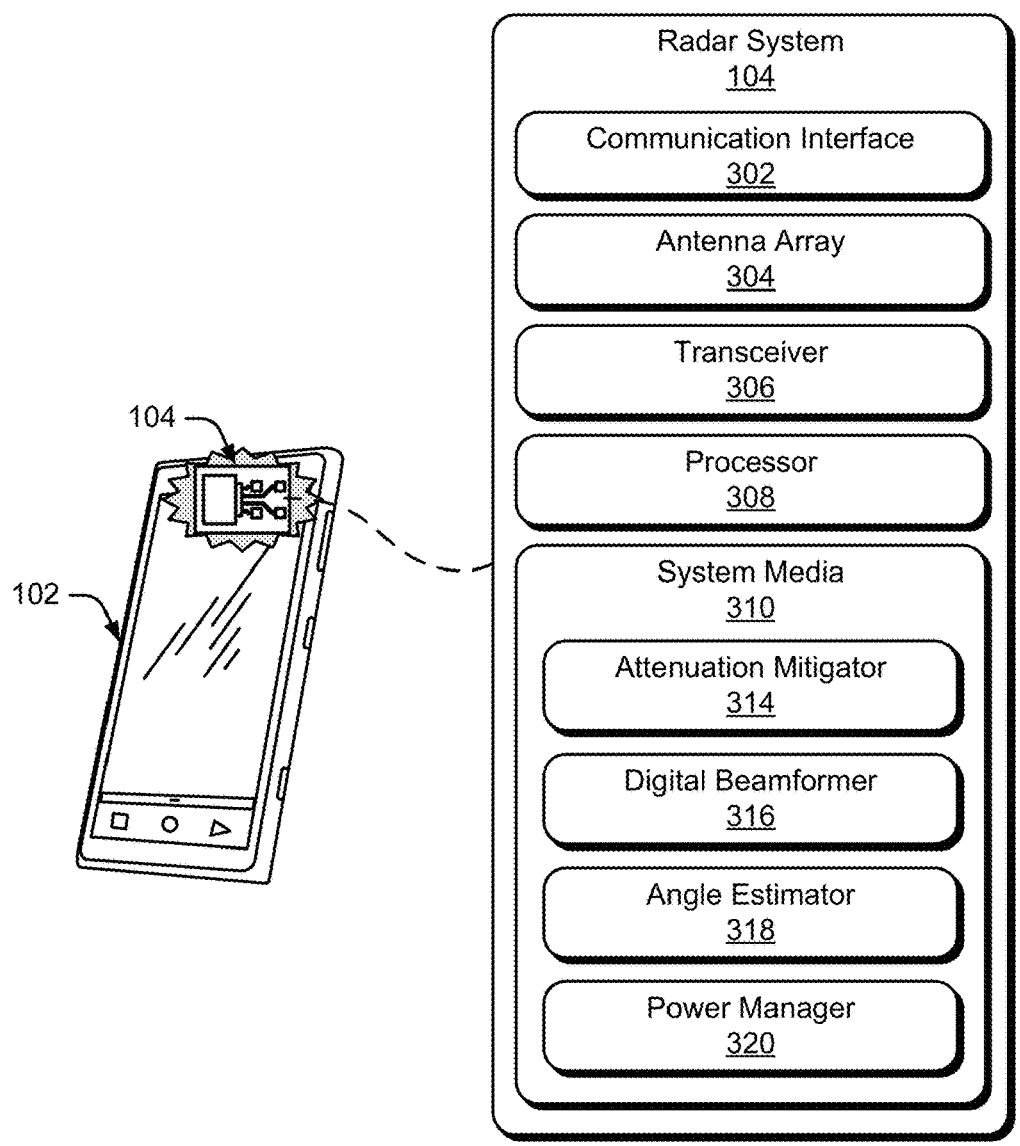
FIG. 3 illustrates an example implementation of the radar system of FIGS. 1 and 2.

FIG. 3 illustrates an example implementation 300 of the radar system 104 that can be used to enable input-mode notification for a multi-input mode. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the electronic device 102) or some combination thereof. The system media 310, which may be included within, or be separate from, the computer-readable media 204 of the electronic device 102, includes one or more of the following modules: an attenuation mitigator 314, a digital beamformer 316, an angle estimator 318, or a power manager 320. These modules can compensate for, or mitigate the effects of, integrating the radar system 104 within the electronic device 102, thereby enabling the radar system 104 to recognize small or complex gestures, distinguish between different orientations of the user, continuously monitor an external environment, or realize a target false-alarm rate. With these features, the radar system 104 can be implemented within a variety of different devices, such as the devices illustrated in FIG. 2.

Using the communication interface 302, the radar system 104 can provide radar data to the IMA manager 106. The communication interface 302 may be a wireless or wired interface based on the radar system 104 being implemented separate from, or integrated within, the electronic device 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the IMA manager 106 for input-mode notification for a multi-input mode.

Figure 4:
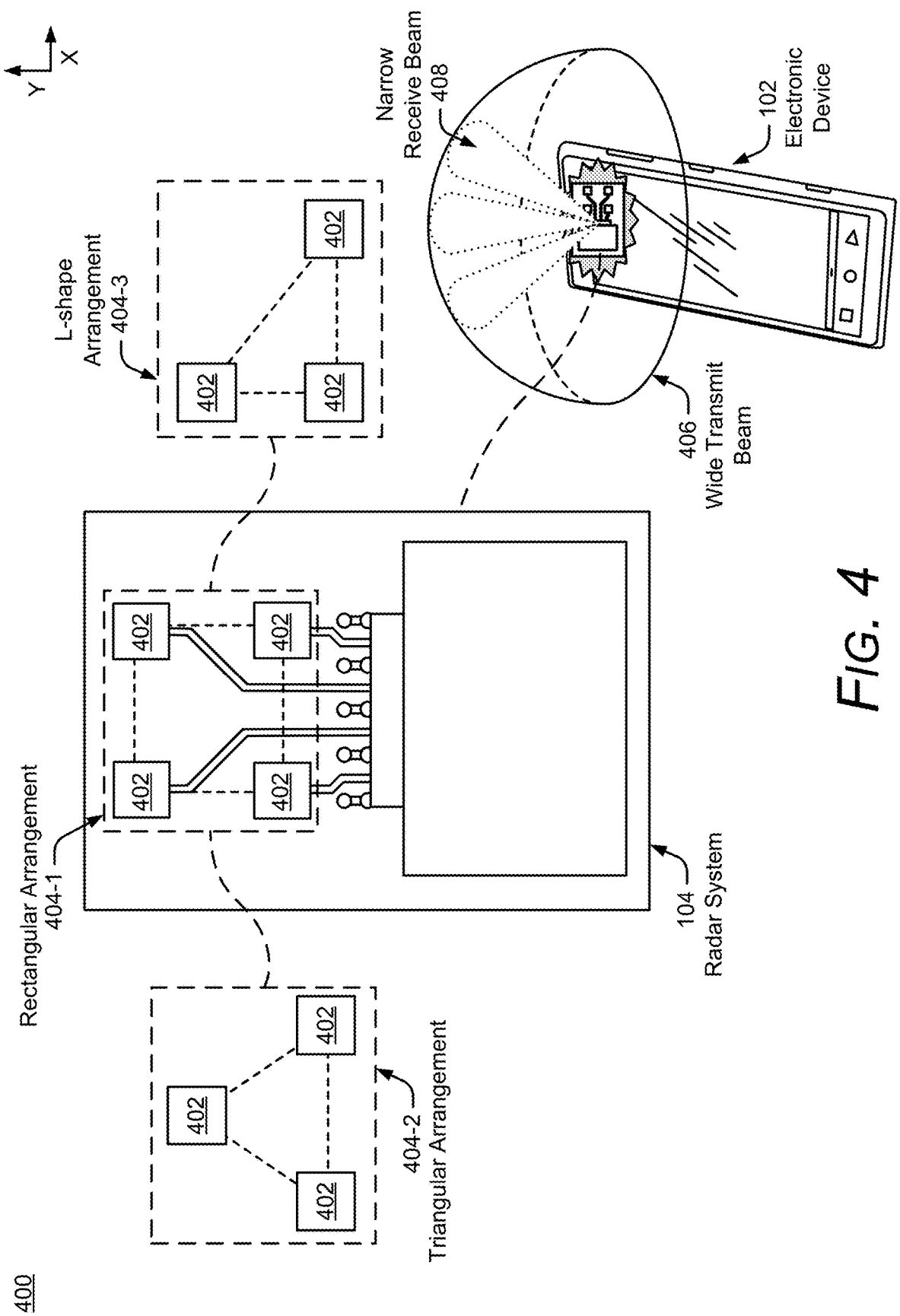
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the electronic device 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

A power manager 320 enables the radar system 104 to conserve power internally or externally within the electronic device 102. In some implementations, the power manager 320 communicates with the IMA manager 106 to conserve power within either or both of the radar system 104 or the electronic device 102. Internally, for example, the power manager 320 can cause the radar system 104 to collect data using a predefined power mode or a specific gesture-frame update rate. The gesture-frame update rate represents how often the radar system 104 actively monitors the external environment by transmitting and receiving one or more radar signals. Generally speaking, the power consumption is proportional to the gesture-frame update rate. As such, higher gesture-frame update rates result in larger amounts of power being consumed by the radar system 104.

Each predefined power mode can be associated with a particular framing structure, a particular transmit power level, or particular hardware (e.g., a low-power processor or a high-power processor). Adjusting one or more of these affects the radar system's 104 power consumption. Reducing power consumption, however, affects performance, such as the gesture-frame update rate and response delay. In this case, the power manager 320 dynamically switches between different power modes such that gesture-frame update rate, response delay and power consumption are managed together based on the activity within the environment. In general, the power manager 320 determines when and how power can be conserved, and incrementally adjusts power consumption to enable the radar system 104 to operate within power limitations of the electronic device 102. In some cases, the power manager 320 may monitor an amount of available power remaining and adjust operations of the radar system 104 accordingly. For example, if the remaining amount of power is low, the power manager 320 may continue operating in a lower-power mode instead of switching to a higher-power mode.

The lower-power mode, for example, may use a lower gesture-frame update rate on the order of a few hertz (e.g., approximately 1 Hz or less than 5 Hz), and consume power on the order of a few milliwatts (mW) (e.g., between approximately 2 mW and 4 mW). The higher-power mode, on the other hand, may use a higher gesture-frame update rate on the order of tens of hertz (Hz) (e.g., approximately 20 Hz or greater than 10 Hz), which causes the radar system 104 to consume power on the order of several milliwatts (e.g., between approximately 6 mW and 20 mW). While the lower-power mode can be used to monitor the external environment or detect an approaching user, the power manager 320 may switch to the higher-power mode if the radar system 104 determines the user is starting to perform a gesture. Different triggers may cause the power manager 320 to dynamically switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the electronic device 102 or a preference to collect data using a longer response delay may cause a lower-power mode to be activated to conserve power.

Each power mode can be associated with a particular framing structure. The framing structure specifies a configuration, scheduling, and signal characteristics associated with the transmission and reception of the radar signals. In general, the framing structure is set up such that the appropriate radar data can be collected based on the external environment. The framing structure can be customized to facilitate collection of different types of radar data for different applications (e.g., proximity detection, feature recognition, or gesture recognition). During inactive times throughout each level of the framing structure, the power manager 320 can turn off the components within the transceiver 306 in FIG. 3 to conserve power. The framing structure enables power to be conserved through adjustable duty cycles within each frame type. For example, a first duty cycle can be based on a quantity of active feature frames relative to a total quantity of feature frames. A second duty cycle can be based on a quantity of active radar frames relative to a total quantity of radar frames. A third duty cycle can be based on a duration of the radar signal relative to a duration of a radar frame.

Consider an example framing structure (not illustrated) for the lower-power mode that consumes approximately 2 mW of power and has a gesture-frame update rate between approximately 1 Hz and 4 Hz. In this example, the framing structure includes a gesture frame with a duration between approximately 250 ms and 1 second. The gesture frame includes thirty-one pulse-mode feature frames. One of the thirty-one pulse-mode feature frames is in the active state. This results in the duty cycle being approximately equal to 3.2%. A duration of each pulse-mode feature frame is between approximately 8 ms and 32 ms. Each pulse-mode feature frame is composed of eight radar frames. Within the active pulse-mode feature frame, all eight radar frames are in the active state. This results in the duty cycle being equal to 100%. A duration of each radar frame is between approximately 1 ms and 4 ms. An active time within each of the active radar frames is between approximately 32 µs and 128 µs. As such, the resulting duty cycle is approximately 3.2%. This example framing structure has been found to yield good performance results. These good performance results are in terms of good gesture recognition and presence detection while also yielding good power efficiency results in the application context of a handheld smartphone in a low-power state. Based on this example framing structure, the power manager 320 can determine a time for which the radar system 104 is not actively collecting radar data. Based on this inactive time period, the power manager 320 can conserve power by adjusting an operational state of the radar system 104 and turning off one or more components of the transceiver 306, as further described below.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (µs), milliseconds (ms), or seconds (s). Further, the power manager 320 can modify transmission power of the radar signals by adjusting an amount of amplification provided by a signal amplifier. Additionally, the power manager 320 can control the use of different hardware components within the radar system 104 to conserve power. If the processor 308 comprises a lower-power processor and a higher-power processor (e.g., processors with different amounts of memory and computational capability), for example, the power manager 320 can switch between utilizing the lower-power processor for low-level analysis (e.g., implementing the idle mode, detecting motion, determining a location of a user, or monitoring the environment) and the higher-power processor for situations in which high-fidelity or accurate radar data is requested by the IMA manager 106 (e.g., for implementing the aware mode, the engaged mode, or the active mode, gesture recognition or user orientation).

Further, the power manager 320 can determine a context of the environment around the electronic device 102. From that context, the power manager 320 can determine which power states are to be made available and how they are configured. For example, if the electronic device 102 is in a user's pocket, then although the user 112 is detected as being proximate to the electronic device 102, there is no need for the radar system 104 to operate in the higher-power mode with a high gesture-frame update rate. Accordingly, the power manager 320 can cause the radar system 104 to remain in the lower-power mode, even though the user is detected as being proximate to the electronic device 102, and cause the display 114 to remain in an off or other lower-power state. The electronic device 102 can determine the context of its environment using any suitable non-radar sensor 108 (e.g., gyroscope, accelerometer, light sensor, proximity sensor, capacitance sensor, and so on) in combination with the radar system 104. The context may include time of day, calendar day, lightness/darkness, number of users near the user 112, surrounding noise level, speed of movement of surrounding objects (including the user 112) relative to the electronic device 102, and so forth).

Figure 5:
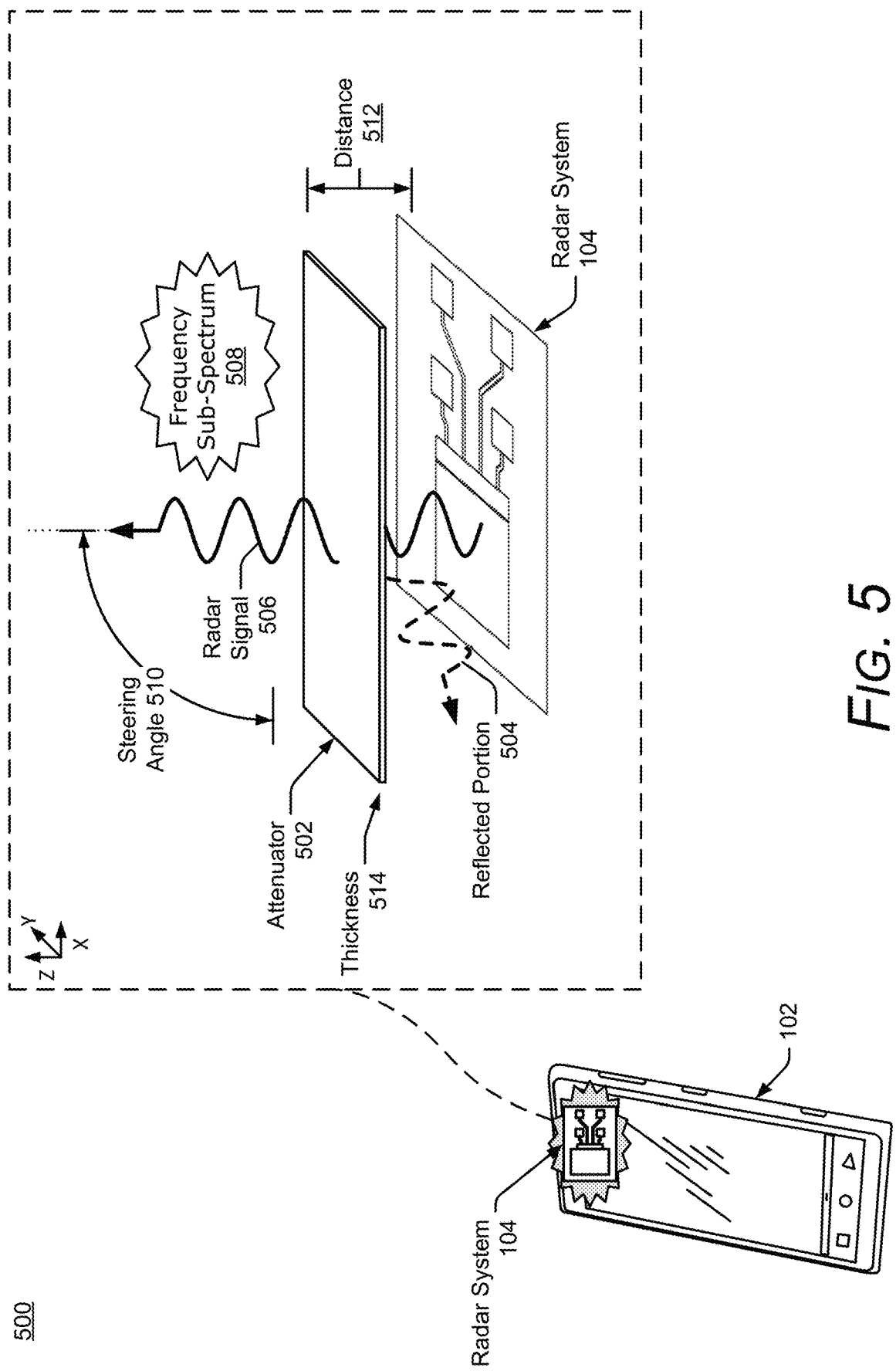
FIG. 5 illustrates additional details of an example implementation of the radar system of FIGS. 1 and 2.

FIG. 5 illustrates additional details of an example implementation 500 of the radar system 104 within the electronic device 102. In the example 500, the antenna array 304 is positioned underneath an exterior housing of the electronic device 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the electronic device 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the electronic device 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
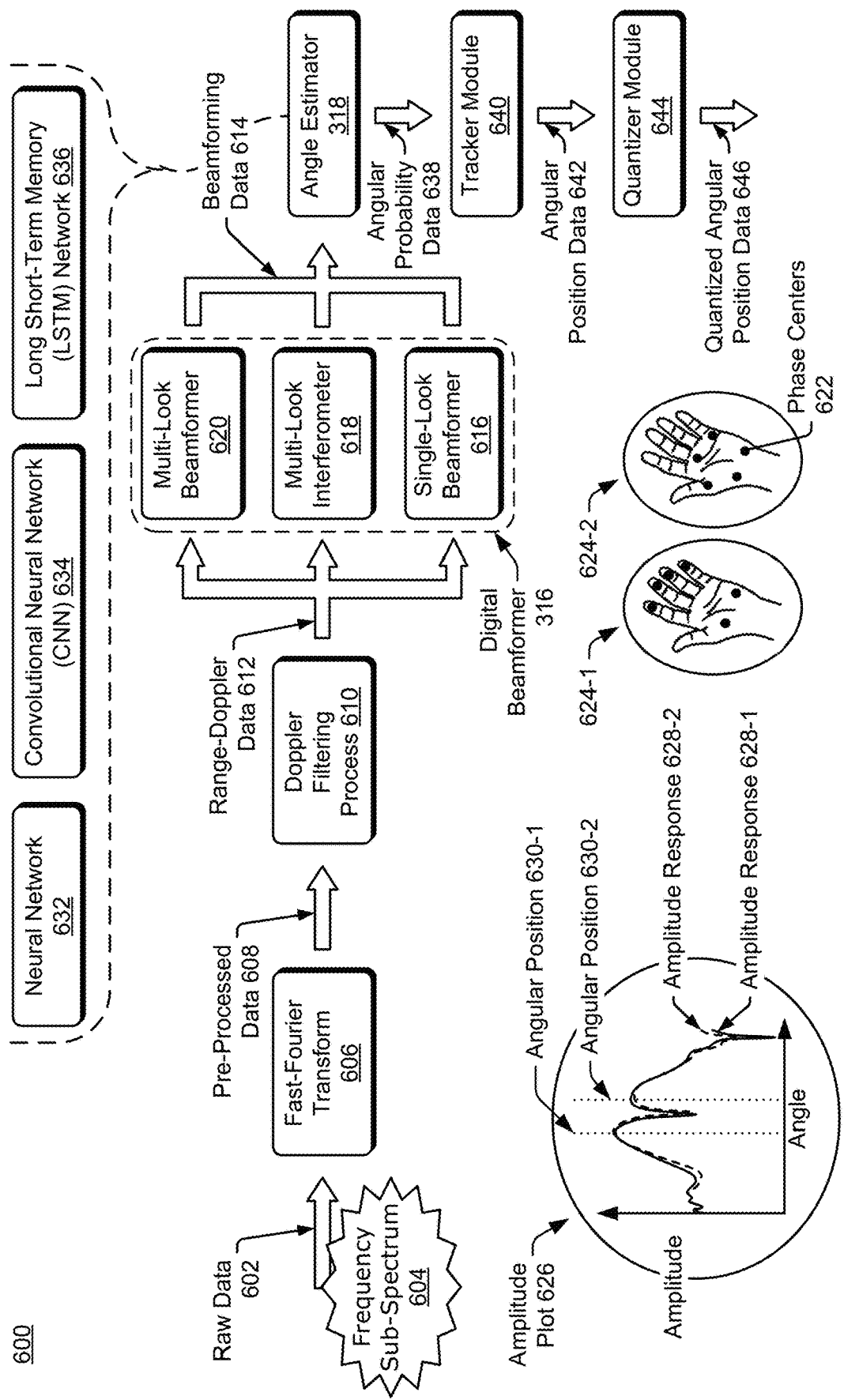
FIG. 6 illustrates an example scheme that can be implemented by the radar system of FIGS. 1 and 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications (e.g., the IMA manager 106), and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal-processing techniques, pattern-matching techniques, or machine-learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to the target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of electronic device 102 (e.g., computational capability or power constraints) or a target angular resolution for the IMA manager 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine-learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the electronic device 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the IMA manager 106. In some situations, fewer quantization levels can be used such that the quantized angular position data 646 indicates whether the target is to the right or to the left of the electronic device 102 or identifies a 90-degree quadrant the target is located within. This may be sufficient for some radar-based applications, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications, such as gesture recognition, or in implementations of the recognition zone, aware mode, engaged mode, or active mode as described herein. In some implementations, the digital beamformer 316, the angle estimator 318, the tracker module 640, and the quantizer module 644 are together implemented in a single machine-learning module.

These and other capabilities and configurations, as well as ways in which entities of FIG. 1-6 act and interact, are set forth below. The described entities may be further divided, combined, used along with other sensors or components, and so on. In this way, different implementations of the electronic device 102, with different configurations of the radar system 104 and non-radar sensors, can be used to implement the input-mode notification for a multi-input mode. The example operating environment 100 of FIG. 1 and the detailed illustrations of FIGS. 2-6 illustrate but some of many possible environments and devices capable of employing the described techniques.

Example Methods

Figure 7:
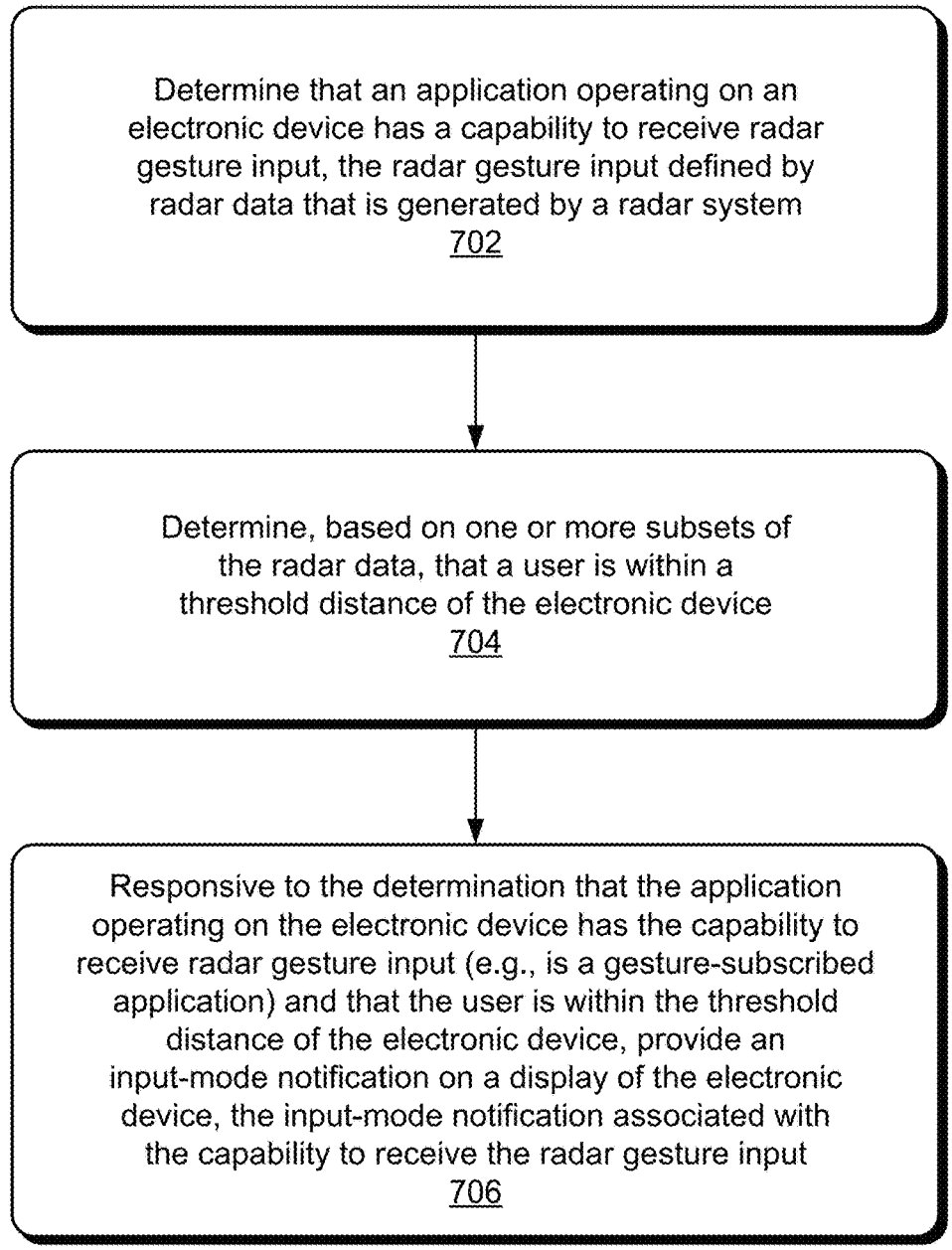
FIG. 7 depicts an example method that enables the input-mode notification for a multi-input mode.

FIG. 7 depicts example method 700, which enables an input-mode notification for a multi-input mode. The method 700 can be performed with an electronic device that includes, or is associated with, a display and a radar system that can provide a radar field. The radar system and radar field can provide radar data, based on reflections of the radar field from objects in the radar field, such as a user of the electronic device. For example, the radar data may be generated by, and/or received through, the radar system 104, as described with reference to FIG. 1. The radar data is used to determine interactions of the user with the electronic device, such as a presence of the user in the radar field, gestures made by the user in the radar field, and movement of the user relative to the electronic device. Based on the determination of the user's presence, movements, and gestures, the electronic device can enter and exit different modes of functionality and present different visual elements on the display. The visual elements provide feedback to the user to indicate the user's posture with respect to the device, the availability of different functionalities for the electronic device, and the user's interactions with the electronic device. Additional examples of the visual elements are described with respect to FIGS. 8-13.

The method 700 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-6, reference to which is made for example only. The techniques are not limited to performance by one entity or multiple entities operating on one device.

At 702, it is determined that an application operating on the electronic device has a capability to receive radar gesture input. The radar gesture input (sometimes referred to as a radar gesture) is defined by radar data that is generated by a radar system. For example, an application manager, such as the IMA manager 106 or the application manager 116, can determine that an application operating on the electronic device (e.g., the electronic device 102) has a capability to receive radar gesture input (e.g., a gesture-subscribed application). The radar data on which the radar gesture input is based may be generated by, and/or received through, the radar system 104, as described with reference to FIG. 1.

At 704, it is determined, based on one or more subsets of the radar data, that a user is within a threshold distance of the electronic device. For example, the IMA manager 106 or the radar system 104 can use the radar data from the radar system 104 to determine that the user 112 is within a threshold distance of the electronic device 102 (e.g., within six inches or within one, three, five, seven, ten, or fourteen feet), or within a recognition zone, as described with reference to FIG. 1.

At 706, in response to determining that the application operating on the electronic device is a gesture-subscribed application and that the user is within the threshold distance of the electronic device, an input-mode notification is provided on a display of the electronic device. Generally, the input-mode notification is a user-perceivable element, such as a visual element that appears on an active area of the display to indicate that the user may use radar gestures to interact with the gesture-subscribed application. For example, the IMA manager 106 can cause the display 114 to present an input-mode notification 118.

As described with reference to FIG. 1, the input-mode notification may be provided along an edge of the display, as described with reference to FIG. 1, and may take any of a variety of shapes, sizes, colors, and other visual parameters or properties (e.g., luminosity, color, contrast, shape, saturation, blur, or opaqueness). In some cases, the visual element may be a portion of the active area of the display that has a luminosity or other visual property that is different from a luminosity or other visual property of the display, has a side that is parallel and/or adjacent to the edge of the active area of the display, and has a shape that extends from the edge of the active area of the display. In some cases, the luminosity of the shape that extends from the edge of the active area of the display varies as the shape extends across a distance from the edge of the active area of the display. In other implementations, the input-mode notification may appear at a location on the display that is not an edge (e.g., the input-mode notification may be presented in an interior region of the display 114 and not be adjacent to or touch an edge of the display).

The color of the input-mode notification may be any suitable color that can be visually differentiated from the background of the display on which it is presented. The color may change based on any of a variety of factors, as described with reference to FIG. 1. In some implementations, a component of the electronic device, such as the IMA manager 106, can determine a background color of a region of the display on which the input-mode notification is displayed. In response to determining the background color, the input-mode notification may be presented in another color that is different from the background color, which provides human-discernable contrast between the input-mode notification and the background color, as described with reference to FIG. 1. In some cases, the color of the input-mode notification can be continuously, automatically, and dynamically adjusted, based on changes to the background color.

The input-mode notification may also or instead appear, at least in part, as a brief animation. For example, the input-mode notification may appear at the edge of the active display and then grow or shrink before taking on a default appearance. Similarly, the color, luminosity, or shape may change as the input-mode notification appears or disappears (e.g., if the gesture-subscribed application stops operating) before taking on the default appearance. Further, the input-mode notification may be an image that appears on the display, rather than an element that appears in a region of the display. The image may have visual parameters or properties that are different from the parameters or properties of an ambient background of the display, such as luminosity, color, contrast, shape, saturation, blur, opaqueness and so forth. In other cases, the ambient background may be an image, and the input-mode notification is the same image, with different visual parameters or properties, such as luminosity, color, contrast, shape, saturation, blur, opaqueness, and so forth. In this way, the input-mode notification can improve the user's experience by communicating to the user that a gesture-subscribed application is operating on the electronic device.

In some implementations of the method 700, the location of the input-mode notification may be determined based on an orientation of content on the display and/or a direction of the radar gesture input that is used to interact with the content. For example, a component of the electronic device, such as the IMA manager 106, may obtain the orientation of the content on the display (e.g., from the application manager 116). Based on the orientation of the content, the display can determine the direction of the radar gesture input that can be used to interact with the content and provide the input-mode notification at a particular edge of the active area of the display that corresponds to the direction of the radar gesture input. Thus, as described with reference to FIG. 1, if the context of the displayed content is horizontal, the input-mode notification is displayed at a top or bottom edge and, if the context of the displayed content is vertical, the input-mode notification is displayed at a side edge.

Further, a change in an orientation of the electronic device with respect to the user may be detected and, based on the change in orientation, the input-mode notification may be provided on a different edge of the display, in order to maintain the orientation and location of the input-mode notification with respect to the user. For example, as described with reference to FIG. 1, the user 112 may rotate the device from a vertical to a horizontal orientation to watch a video or from a horizontal to a vertical orientation to read an article. Based on the change in orientation, the IMA manager 106 can cause the display 114 to provide the input-mode notification 118 on a different edge of the active display, in order to maintain an orientation and location of the input-mode notification 118 with respect to the user 112. As noted, the orientation of the content may also be accounted for, and these features can be used in conjunction with each other to provide the input-mode notification on the display at the location appropriate for the orientation of both the content on the display and the orientation of the display with respect to the user.

In some cases, it can be determined that the gesture-subscribed application running on the electronic device is operating in an immersive mode (e.g., in a full-screen mode without any presented controls). In response to this determination, the display can periodically provide the input-mode notification. For example, as described with reference to FIG. 1, the input-mode notification can be provided on the display for a presentation time duration and then stop being provided for a non-presentation time duration. Both the presentation time duration and the non-presentation time duration may be predetermined or selectable. The time durations may be selectable (e.g., by the user 112 or by the IMA manager 106 based on various factors, such as the type of gesture-subscribed application running in the immersive mode, the status of the gesture-subscribed application, or the frequency with which the user employs a radar gesture).

The input-mode notification may fade or disappear entirely when the user interacts with the electronic device using input other than a radar gesture (e.g., a touch or voice input). For example, as described with reference to FIG. 1, the user may decide to start an application using a touch command on the electronic device (or decide to touch or press a power or lock control), while a gesture-subscribed application is also running. In this case, the input-mode notification may fade or disappear when the user picks up the electronic device or touches the display. The input-mode notification restarts when the user stops touching the display or puts down the electronic device (if one or more gesture-subscribed applications are still operating). The input-mode notification may reappear or brighten immediately when the touch or voice input ends, or after a selectable default time duration. Similarly, when the gesture-subscribed application is an application that provides an alert or notification, the input-mode notification appears when an alert or notification is displayed and, when the user interacts with the alert or notification using a radar gesture, the input-mode notification disappears, unless other gesture-subscribed apps are running. As noted with reference to FIG. 1, the input-mode notification 118 may be presented at a changing or shifting location, or be alternately shown and hidden, based on an operational state, a screen state, a power state, or a functional mode of the electronic device 102, in order to reduce the risk of the input-mode notification 118 causing screen burn-in or a ghost image.

The input-mode notification can be provided while the electronic device 102 is in a locked state or an unlocked state. Thus, the electronic device may provide the input-mode notification when a user is nearby, whether the user is authenticated or not authenticated. As described with reference to FIG. 1, the locked and unlocked states refer to a level of access to the electronic device. A locked state may be a state in which no user in authenticated and anyone using the device will have less than full rights or access (e.g., no access or rights, or limited access or rights). Examples of the locked state may include the aware and engaged modes of the electronic device as described herein. Similarly, an unlocked state can be a state in which at least one user is authenticated and that user has full rights and/or access to the device. An example of the unlocked state is the active mode of the electronic device, as described herein.

These techniques for an input-mode notification for a multi-input mode may be more secure than other authentication and feedback techniques. For example, a user's position, orientation, or 3D gestures (especially user-defined gestures, micro-gestures, and posture or position-based gestures) are typically not duplicable or obtainable by an unauthorized person (unlike, for example, a password). Further, a radar image of the user (e.g., based on the radar data described above), even if it includes the user's face, does not visually identify the user like a photograph or video may do. Even so, further to the descriptions above, the user may be provided with controls allowing the user to make an election as to both whether and when any of the systems, programs, managers, modules, or features described in this document may enable collection of user information (e.g., images of the user, radar data describing the user, information about a user's social network, social actions or activities, profession, a user's preferences, or a user's current location), and whether and when the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip/postal code, or state level), so that a particular location of a user cannot be determined. Thus, the user may have control over what information is collected about the user, how that information is used, and what information is provided to or about the user.

Example Visual Elements

As noted, the techniques and systems described herein can enable the electronic device 102 to provide feedback and notification to make the user aware of an available radar gesture input mode and, in some cases, provide additional feedback regarding the use and results of the radar gestures. The feedback and notification are provided by one or more user-perceivable elements, such as visual elements that are presented on the display 114. The techniques and systems can also enable a determination of the user's absence, presence, and location, which can be used to provide a more-responsive and more-efficient authentication process. For example, the techniques enable the electronic device to anticipate when the user is ready to be authenticated and to more-accurately determine when to lock the device when the user is away. The feedback, visual elements, and other features enable interactions that are more convenient and less frustrating because the user is aware of the input modes and can be confident about different ways in which the device can interact and receive input. FIGS. 8-16 illustrate examples of the electronic device 102 running a gesture-subscribed application and describe examples of the visual elements that can be presented on the display to provide feedback to the user. Examples of the electronic device operating in multiple different modes and examples of the visual elements that can be presented on the display in the different modes are also described.

Figure 8:
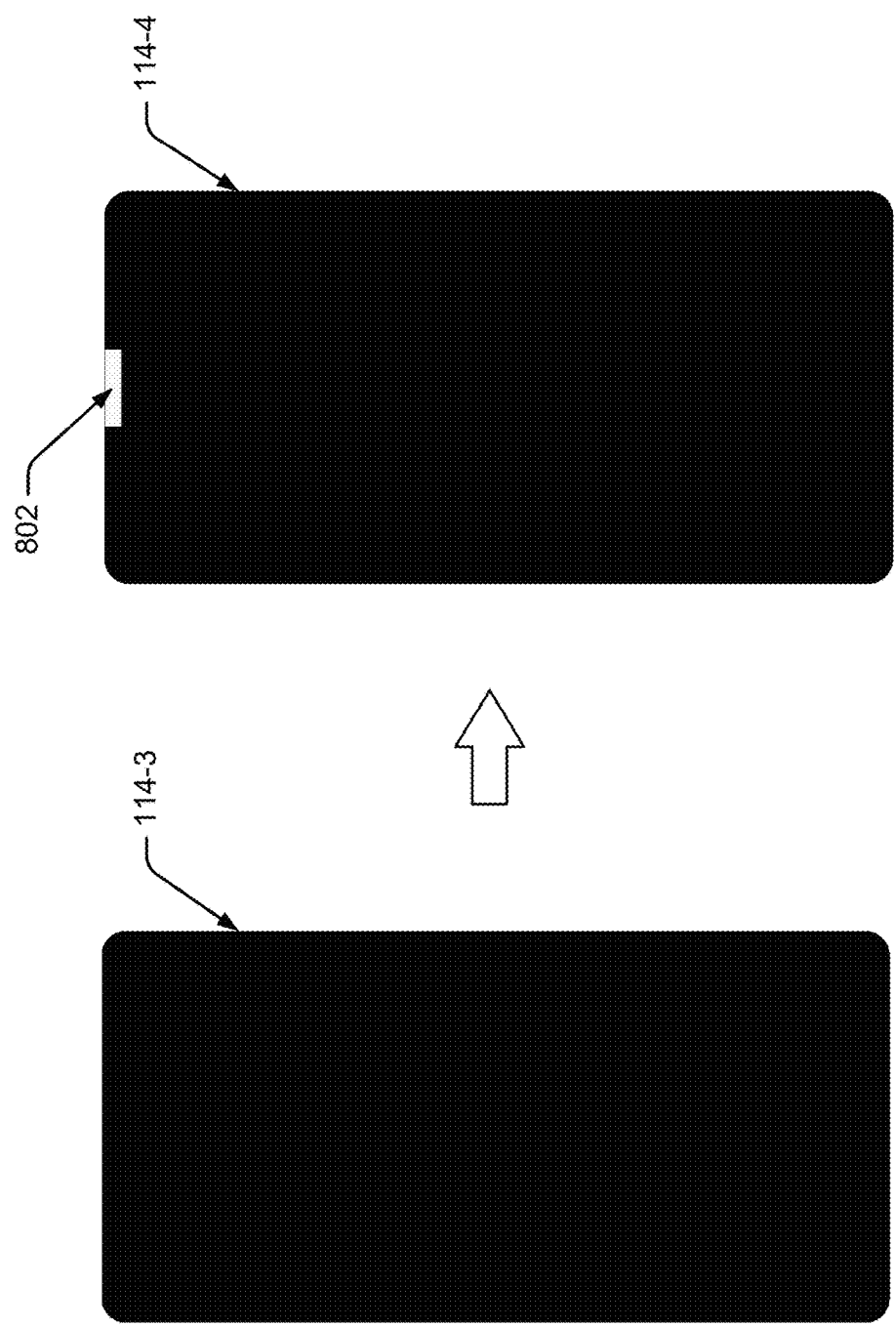
FIGS. 8-13 illustrate visual elements, including the input-mode notification, which can be presented on the display of the electronic device of FIGS. 1 and 2 when a gesture-subscribed application is running on the electronic device.

Consider FIG. 8, which illustrates generally, at 800, an example of the input-mode notification 118 that can be used to indicate that a gesture-subscribed application is running on the electronic device 102. In FIG. 8, an example display 114-3 is shown to indicate a state of the electronic device 102 with no gesture-subscribed application running Another state of the electronic device 102, in which at least one gesture-subscribed application is running, is shown on another example display 114-4. A visual element 802 (e.g., the example input-mode notification 118) at the top of the example display 114-4 indicates that the electronic device 102 can receive input through radar gestures, as described above. The visual element 802 is shown as an illuminated line, but, as noted above, may be presented at another location, at a different illumination level (e.g., only partially illuminated), or as another shape or type of element.

Figure 9:
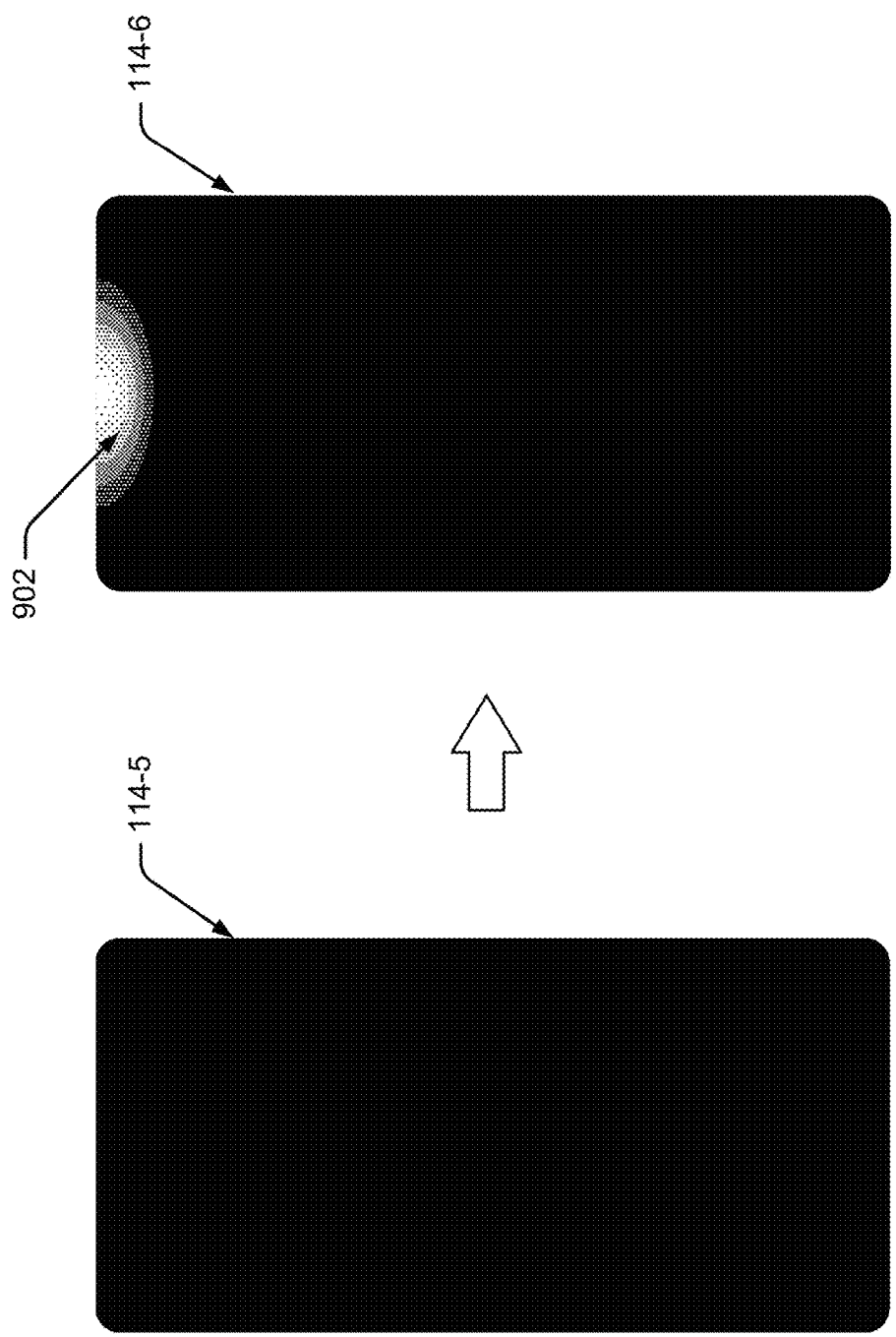
Figure 10:
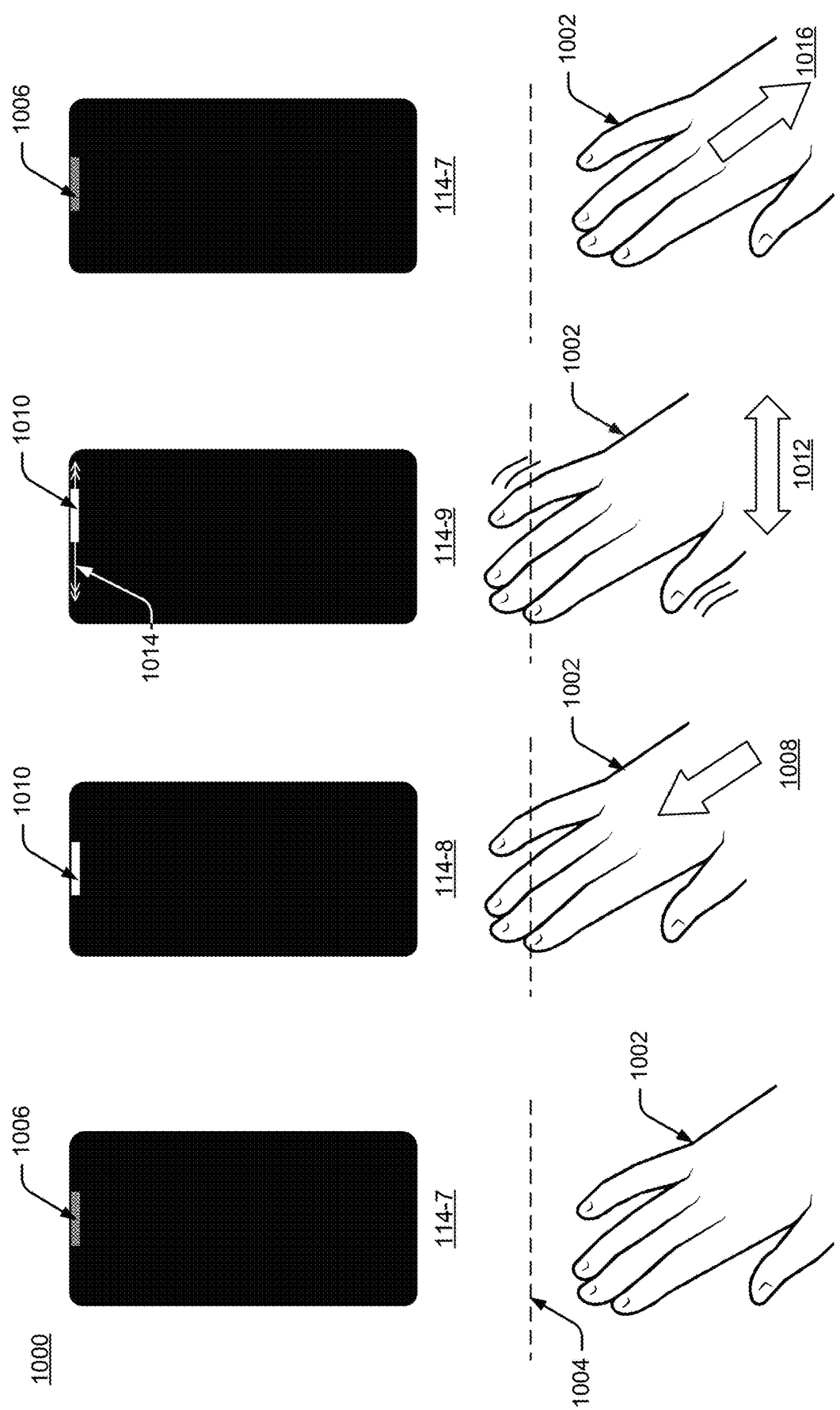

For example, FIG. 9 illustrates generally, at 900, another example of the input-mode notification 118 that can be used to indicate that a gesture-subscribed application is running on the electronic device 102. In FIG. 9, an example display 114-5 is shown to indicate the state of the electronic device 102 with no gesture-subscribed application running Another state of the electronic device 102, in which at least one gesture-subscribed application is running, is shown on another example display 114-6. A visual element 902 (e.g., another example input-mode notification 118) at the top of the example display 114-6 indicates that the electronic device 102 can receive input through radar gestures, as described above. The visual element 902 is shown as an illuminated area (e.g., a glowing area). As with the visual element 802, the visual element 902 could be presented at another location on the display 114-6, at a different illumination level (e.g., more-illuminated or less-illuminated), or as another shape or type of element. Note that for clarity, no other elements (e.g., time, date, or application launch icons) are shown on the example displays 114-3 through 114-6. In other implementations, however, the visual elements 802 or 902 may be displayed along with other content on the display. Further, the visual elements 802 or 902 may be displayed while the electronic device 102 is in the aware mode, the engaged mode, the active mode, or another mode.

In some implementations, the electronic device 102 can also provide more-detailed visual feedback that is related to the availability of radar gestures. For example, the IMA manager 106 may cause the display 114 to present other visual elements that provide feedback regarding input received through radar-based radar gestures. FIGS. 10-13 illustrate additional details of some of the ways that visual elements can be used to provide the feedback related to the use of radar gestures.

Consider FIGS. 10A-10D, which illustrate generally, at 1000, example visual elements that may be used to indicate that a user's hand is within a gesture zone that enables a gesture-subscribed application to receive radar gesture input. The gesture zone is an area around the electronic device 102 (or the radar system 104) within which the electronic device 102 can receive, interpret, and act on radar gestures, such as a swipe or a pinch. The gesture zone can extend any suitable distance from the electronic device 102 (e.g., approximately three, approximately five, approximately seven, or approximately ten inches).

In FIG. 10A, an example display 114-7 is shown in a state in which at least one gesture-subscribed application is running (e.g., similar to the example display 114-4 described with reference to FIG. 8). A user's hand 1002 is shown near the example display 114-7, but outside the gesture zone (the border of the gesture zone is shown as a dotted line 1004). A visual element 1006 is shown as an illuminated line near the top of the example display 114-7, but the visual element 1006 could be presented at another location or as another shape or type of element (e.g., as shown in FIG. 9). In FIG. 10B, the user's hand 1002 moves toward the electronic device and crosses the border of the gesture zone 1004, as shown by the arrow 1008. In response to the electronic device detecting the movement 1008, another visual element 1010 replaces the visual element 1006, as shown on an example display 114-8. In this example, the visual element 1010 is a brighter line (e.g., more- or fully-illuminated) near the top of the display, but the visual element 1010 could also be presented at another location or as another shape or type of element.

As shown in FIG. 10C, when the user's hand 1002 is within the border of the gesture zone 1004, the visual element 1010 can be used to provide feedback that indicates smaller, non-gesture motion of the user's hand 1002, which are represented by a double-ended arrow 1012. For example, as shown on an example display 114-9, the visual element can move to indicate the user's hand movements by moving back and forth with the user's hand, as shown by an arrow 1014. In FIG. 10D, the user's hand 1002 is withdrawn outside the border of the gesture zone 1004, as shown by an arrow 1016. In response to the motion of the user's hand, the display 114 returns to the state as shown in the example display 114-7, in which the visual element 1006 is displayed near the top of the example display 114-7.

In some implementations (not shown in FIG. 10A-10D), the non-gesture motions can be represented by other visual elements or changes to the visual elements. For example, in a case in which the visual element is a "glowing" shape (e.g., a shape with varying brightness, color, or other properties), a focal point of the shape can shift to represent the motions, while the shape itself remains stationary. Additionally or alternatively, changes to an intensity of the brightness or color can be used to represent the motion (e.g., the brightness or color of the shape, or part of the shape, change in accordance with the non-gesture motions. The visual elements 1006 and 1010, along with the motion of the visual element 1010, can help the user 112 understand when gestures are available, and provide feedback that indicates the electronic device 102 is aware of the relative position of the user's hand, which can improve the user's experience with the electronic device 102.

As described with reference to FIG. 10C, the electronic device 102 can provide visual feedback to represent smaller, non-gesture motion of the user's hand in the gesture zone, such as moving a visual element back and forth on the display, corresponding to the motion of the user's hand. Similarly, when the user 112 makes a radar gesture (e.g., a swiping gesture to skip a song or an omni-gesture to dismiss an alert or notification), the electronic device 102 can provide feedback to notify the user 112 that the gesture has been successfully received or that a gesture attempt was received but it was not clear enough to be confirmed as a radar gesture. For example, FIG. 11 illustrates generally, at 1100, a sequence of example visual elements that can be used to notify the user 112 that a gesture has been successfully received.

Figure 11:
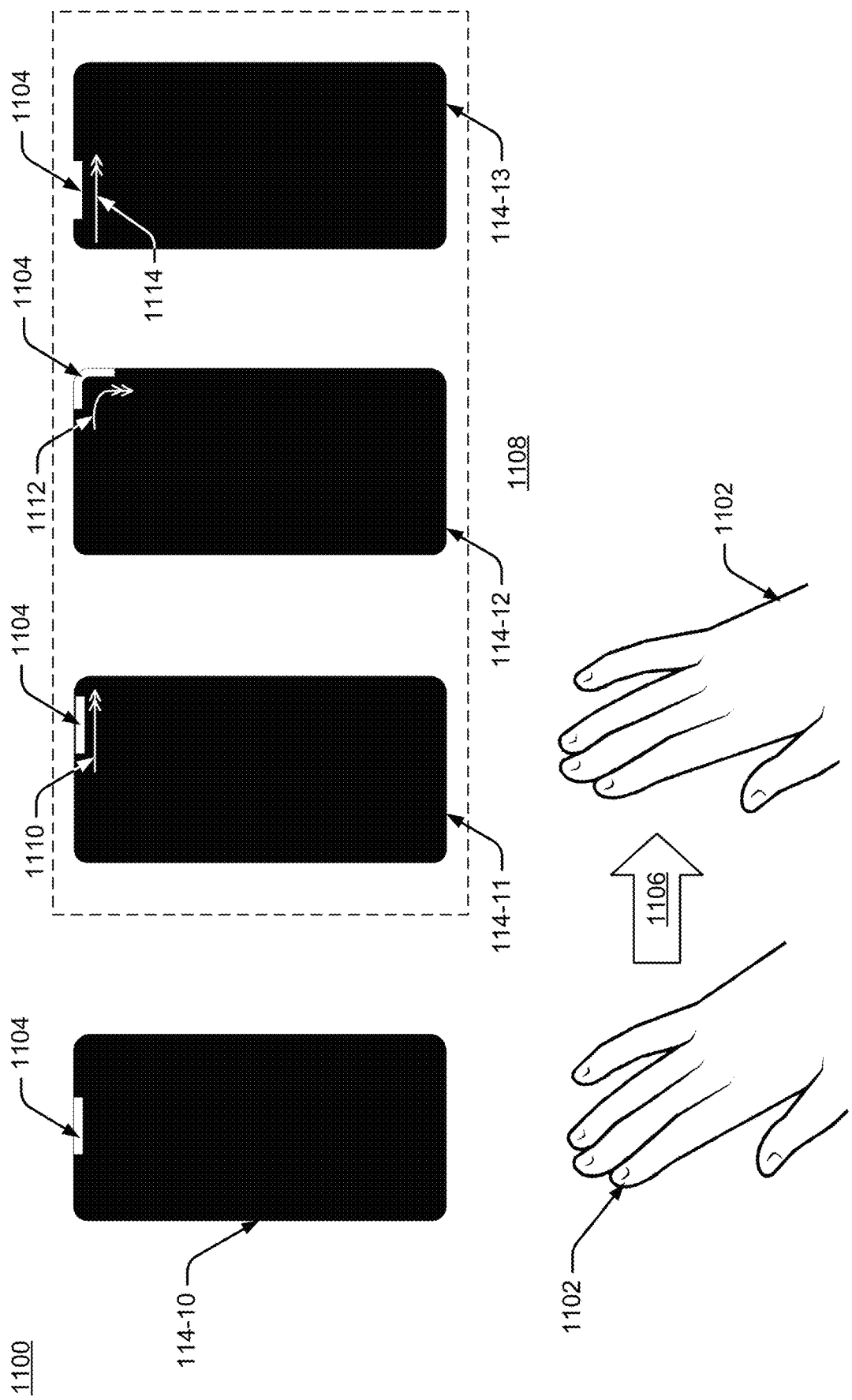

In FIG. 11, an example display 114-10 is shown in a state in which at least one gesture-subscribed application is running and a user's hand 1102 is within a boundary of a gesture zone (e.g., similar to the example display 114-8 described with reference to FIG. 10B). The example display 114-10 is presenting a visual element 1104, shown as an illuminated line near the top of the example display 114-10, to indicate the availability of radar gestures and that the user's hand 1102 is within the gesture zone. In the example of FIG. 11, the user 112 makes a sliding or swiping gesture from left to right, as shown by the arrow 1106. In response to the motion 1106 of the user's hand 1102, the visual element 1104 also moves, as shown in a sequence 1108 (shown within a dashed-line rectangle). An example display 114-11 illustrates the beginning of the sequence 1108, as the visual element 1104 begins moving to the right, as shown by an arrow 1110.

The sequence 1108 continues in another example display 114-12, in which the visual element 1104 bends around a corner of the example display 114-12, as shown by an arrow 1112. The visual element 1104 can continue down a side of the display 114 for a variable distance (e.g., as soon as a trailing end of the visual element completes the bend or after the trailing end has traveled a particular distance along the side) and then disappear. Continuing the sequence 1108 in another example display 114-13, the visual element 1104 reappears or regenerates from the left side of the example display 114-13 and moves toward the center position, as shown by an arrow 1114. In some implementations, the visual element 1104 can reappear or regenerate at the initial position (as shown in the example display 114-10), rather than from the left side. When the sequence 1108 is complete, the display returns to the state as shown in the example display 114-10, with the visual element 1104 displayed near the top of the display 114. In some implementations, a motion of the visual element 1104 can subtly track the user's hand 1102 while the hand remains within the boundary of the gesture zone. The motion of the visual element 1104 can help the user 112 understand when radar gestures have been accepted and when the gesture is complete, which can improve the user's experience with the electronic device 102.

Note that the sequence 1108 begins when the user 112 begins the gesture, but the gesture and the sequence 1108 may be completed at different times. Further, as described above, while the visual element 1104 is shown as a partially illuminated line near the top of the display 114, the visual element 1104 could be presented at another location or as another shape or type of element (e.g., as shown in FIG. 9). The sequence 1108 could also begin at another location on the display 114 and proceed in another direction, such as right to left, top to bottom, or bottom to top (e.g., if a radar gesture moved from right to left, top to bottom, or bottom to top). More examples of sequences that show a successful radar gesture (not shown in FIG. 11) include a visual element that collapses on itself, briefly disappears, and then regenerates (e.g., from its original position). Other examples also include a visual element that bends or flexes (e.g., at one end, both ends, in the middle, or at another location) to show a successful radar gesture, such as a gesture made in a direction perpendicular to the display 114 or a gesture with a component that is perpendicular to the display 114.

In some cases, as described herein, the visual element may be hidden even when radar gestures are available (e.g., because the user interacted with a voice or touch input, or in order to reduce the risk of screen burn-in). In this situation, the visual element, such the visual element 1104, may still be shown when the user makes a successful radar gesture. Consider an example, in which the visual element is hidden while the user is listening to music and using a voice input to open another application. In the example, the user performs a radar gesture to skip a song, and the display presents the sequence 1108 to notify the user that the radar gesture was successful.

Figure 12:
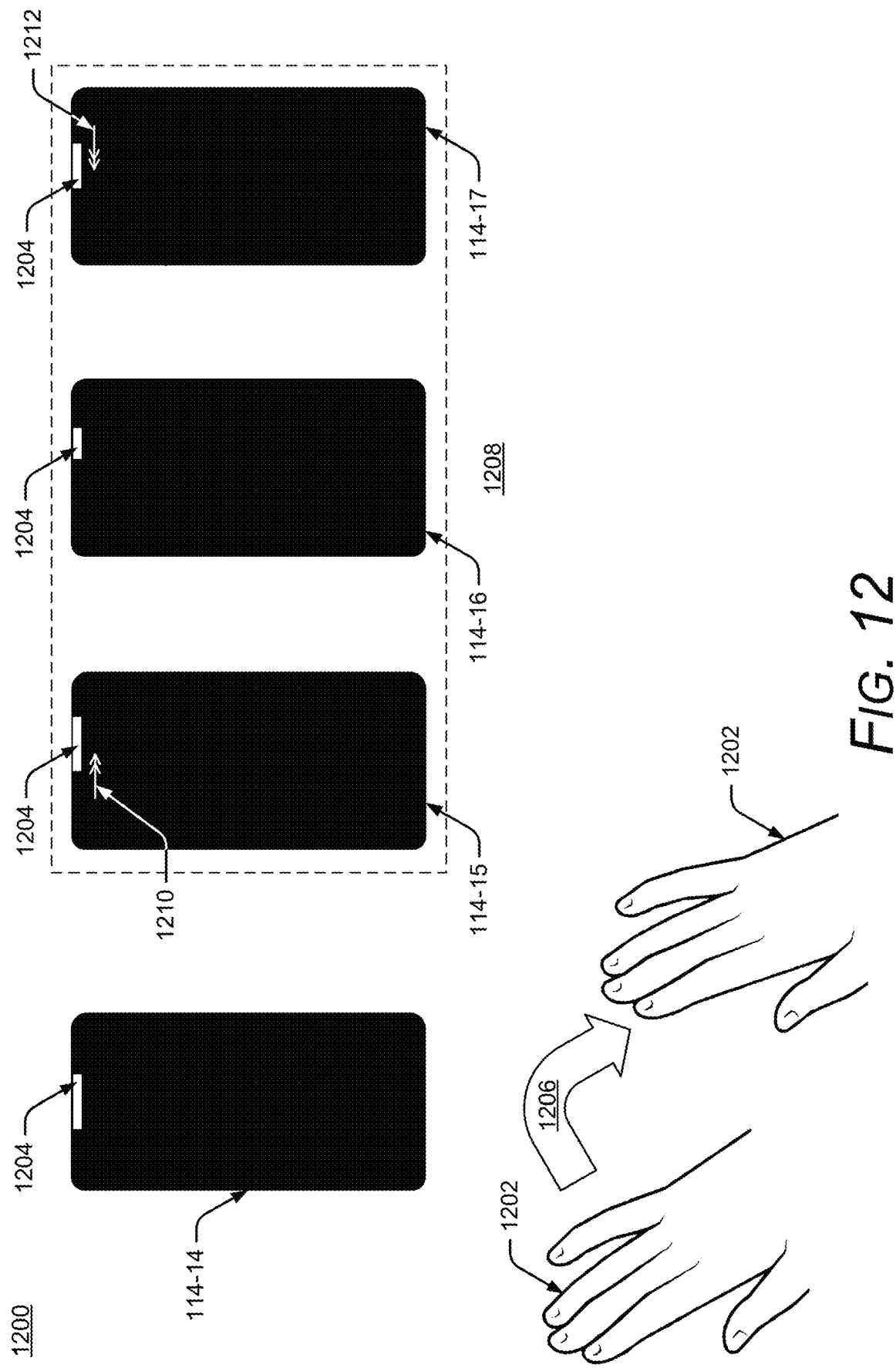

FIG. 12 illustrates generally, at 1200, a sequence of example visual elements that can be used to notify the user 112 that a gesture has failed to be successfully received. In FIG. 12, an example display 114-14 is shown in a state in which at least one gesture-subscribed application is running and in which a user's hand 1202 is within the boundary of a gesture zone (e.g., similar to the example display 114-8 described with reference to FIG. 10B). The example display 114-14 is presenting a visual element 1204, shown as an illuminated line near the top of the example display 114-14, to indicate the availability of radar gestures and that the user's hand 1202 is within the gesture zone. In the example of FIG. 12, the user 112 attempts to make a sliding or swiping gesture from left to right, but fails to meet sufficient standards for a swiping gesture. For example, as shown by a curved arrow 1206, the user's hand 1202 may fail to travel sufficient distance in a relevant direction before withdrawing. In this case, when the electronic device 102 (or the radar system 104) detects the motion 1206 of the user's hand 1202, which lacks sufficient definition to be successfully determined to be a radar gesture, the visual element 1204 moves as shown in a sequence 1208 (shown within a dashed-line rectangle). An example display 114-15 illustrates the beginning of the sequence 1208, as the visual element 1204 begins moving to the right, as shown by an arrow 1210.

Continuing the sequence 1208 in another example display 114-16, the visual element 1204 has stopped before reaching an opposite edge of the example display 114-16 and has shrunk (compared to its starting length as shown in the example display 114-14). The sequence 1208 continues in another example display 114-17, in which the visual element 1204 reverses direction and begins to move back toward its original location (the center in this example), as shown by another arrow 1212. The visual element 1204 also begins to grow back to its original length. In other implementations, rather than stopping and shrinking, the visual element 1204 may slow and bounce before reversing direction. When the sequence 1208 is complete, the display returns to the state as shown in the example display 114-14, with the visual element 1204 displayed near the top of the example display 114 and subtly tracking the user's hand 1202 while it remains within the boundary of the gesture zone. The motion of the visual element 1204 can help the user 112 understand when a gesture has not been successfully completed so that the user can learn techniques for making successful radar gestures and become aware when an attempted gesture fails (e.g., so it can be attempted again, if necessary), which can improve the user's experience with the electronic device 102.

Note that the sequence 1208 may begin when the electronic device 102 (or the IMA manager 106) detects (e.g., using one or more subsets of the radar data) that the user 112 has attempted a radar gesture, but also determines that the gesture fails to meet at least one criterion that is necessary for acceptance. Accordingly, the attempted gesture and the sequence 1208 may be completed at different times, depending on the nature of the attempted gesture and the speed of the sequence 1208. Further, as described above, while the visual element 1204 is shown as a partially illuminated line near the top of the display 114, the visual element 1204 may be presented at another location or as another shape or type of element (e.g., as shown in FIG. 9). The sequence 1208 could also begin at another location on the display 114 and proceed in another direction, such as right to left, top to bottom, or bottom to top (e.g., if an attempted radar gesture moved from right to left, top to bottom, or bottom to top). The sequence 1208 can also include periods of time in which the visual element 1204 changes one or more visual properties, such as brightness, luminosity, saturation, and so forth (not illustrated). Other examples of sequences that show an unsuccessful radar gesture attempt include a visual element that partially collapses on itself, such as by briefly shrinking, and then returns to its original size and position.

In some implementations, the electronic device 102 includes a gesture-paused mode that can turn off or suspend the radar gesture capabilities of the electronic device 102 when conditions indicate that the system may be inefficient or ineffective at receiving or interpreting the gestures. For example, when the electronic device 102 is moving at a velocity above a threshold, or when the direction in which the electronic device 102 is moving changes rapidly and repeatedly, the electronic device can enter the gesture-paused mode and provide visual feedback to the user. The electronic device 102 may determine to enter the gesture-paused mode based on input from any of a variety of sensors, including a radar sensor (e.g., the radar system 104), an inertial measurement unit (IMU), a proximity sensor (e.g., an active infrared proximity sensor), and so forth. For example, if the user 112 is walking and listening to audio content with the electronic device 102 in the user's hands swinging back and forth, the motion may be similar to a radar-based swipe gesture, but the user 112 does not intend to skip tracks or adjust the volume. Accordingly, because the motion of the electronic device 102 can introduce ambiguity into the gesture interpretation process, the electronic device 102 may determine to enter the gesture-paused mode until the ambiguity is resolved (e.g., the user 112 stops walking).

Figure 13:
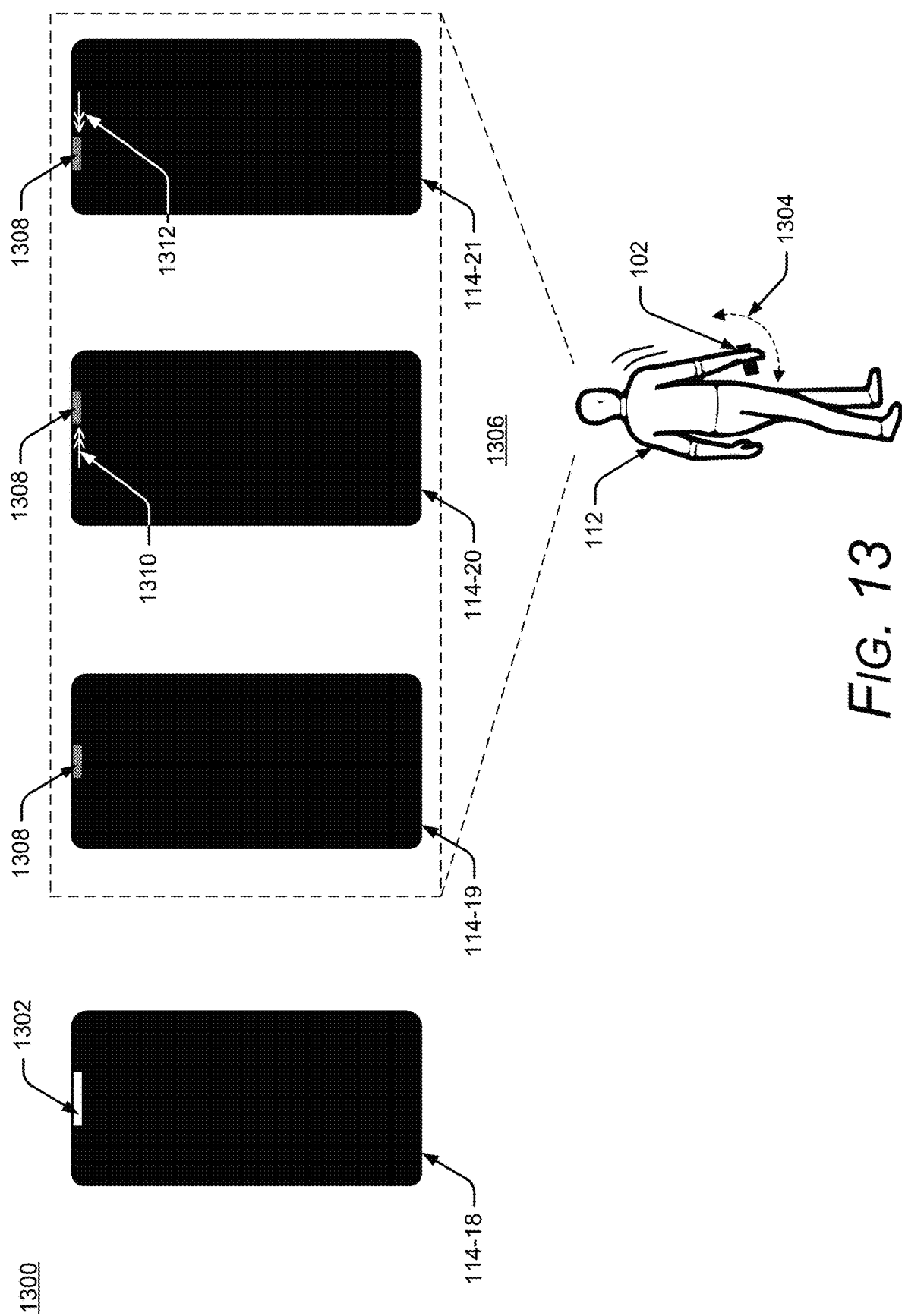

Consider FIG. 13, which illustrates generally, at 1300, example visual elements that may be used to indicate that a gesture-subscribed application is available to receive radar gesture input, but that gestures are currently paused. The gesture-paused mode may be activated whenever radar gestures are available, whether the user's hand is in or out of the gesture zone. In FIG. 13, an example display 114-18 is shown in a state in which at least one gesture-subscribed application is running and a user's hand is within the boundary of a gesture zone (e.g., similar to the example display 114-8 described with reference to FIG. 10B). The example display 114-18 is presenting a visual element 1302, shown as an illuminated line near the top of the example display 114-18, to indicate the availability of radar gestures and that the user's hand 1102 is within the gesture zone. If the user 112 takes an action that causes the electronic device 102 to enter the gesture-paused mode (e.g., the user's hand begins moving back and forth as the user 112 is walking, as shown by an arrow 1304), the visual element 1302 changes, as shown in a sequence 1306 (within a dashed-line rectangle).

An example display 114-19 illustrates the beginning of the sequence 1306 as another visual element 1308 replaces the visual element 1302, in response to the electronic device 102 detecting the movement 1304. As shown on an example display 114-19, the visual element 1308 is another line that is shorter and dimmer than the visual element 1302. In implementations in which the visual element 1302 has a particular color, the visual element 1308 may have a different color from that of the visual element 1302 (e.g., the color may change from the particular color to another color, such as grey or white). The sequence 1306 continues in another example display 114-20, in which the visual element 1308 begins moving to the right, as shown by an arrow 1310. Continuing the sequence 1306 in another example display 114-21, the visual element 1308 moves to the left as shown by an arrow 1312. In the sequence 1306, the visual element 1308 may stop and reverse direction before it reaches a side of the display or go all the way to the edge before reversing direction. In some implementations, the visual element 1308 may further shrink when it stops to reverse directions and then return to another size when, after, or as, it begins moving in the opposite direction. Further, the oscillation of the visual element 1308 may match the condition upon which the gesture-paused mode is based. For example, in the case of the user's arms swinging, the velocity or frequency of the oscillation of the visual element 1308 may approximately match the velocity or frequency of the user's hand moving.

As described above, while the visual element 1308 is shown as a partially illuminated line near the top of the display 114, the visual element 1308 can be presented at another location or as another shape or type of element (e.g., as shown in FIG. 9). The sequence 1108 can also begin at another location on the display 114 and proceed in another direction, such as right to left, top to bottom, or bottom to top (e.g., depending on the orientation of content on the display 114, the direction of the radar gesture input, or another factor).

When the electronic device 102 exits the gesture-paused mode, the sequence 1306 is complete and the display 114 returns to an appropriate state, depending on whether there are gesture-subscribed applications running and on the location of the user's hand. The sequence 1306 of motion of the visual element 1308 can help the user 112 understand when gestures may be paused and allow the user 112 to adjust how the electronic device 102 is used to avoid or take advantage of the gesture-paused mode, which can improve the user's experience with the electronic device 102.

In some cases (not shown in FIG. 13), the user's motion may not introduce ambiguity, such as a situation in which the user walking with the electronic device and holding it steady in front of the user. In these cases, the electronic device does not enter the gesture-paused mode and the visual element 1302 may change one or more visual parameters to alert the user that radar gestures are available, even while the user and the electronic device are in motion. For example, the visual element 1302 may change from a default color to another color (e.g., from grey to blue, grey to white, or white to blue).

In some implementations, the electronic device 102 can determine that the gesture-subscribed application running on the electronic device 102 is operating in an immersive mode (e.g., in a full-screen mode without any presented controls). In response to this determination, the display can periodically provide the visual elements described with reference to FIGS. 8-13 (e.g., the visual elements 802, 902, 1006, 1010, 1104, 1204, 1302, and/or 1308). For example, the visual element can be provided on the display for a time duration and then stop being provided for another time duration. The time durations may be selectable (e.g., by the user 112 or by the electronic device 102, based on factors such as the type of gesture-subscribed application running in the immersive mode, the status of the gesture-subscribed application, or the frequency with which the user 112 employs a radar gesture).

Figure 14:
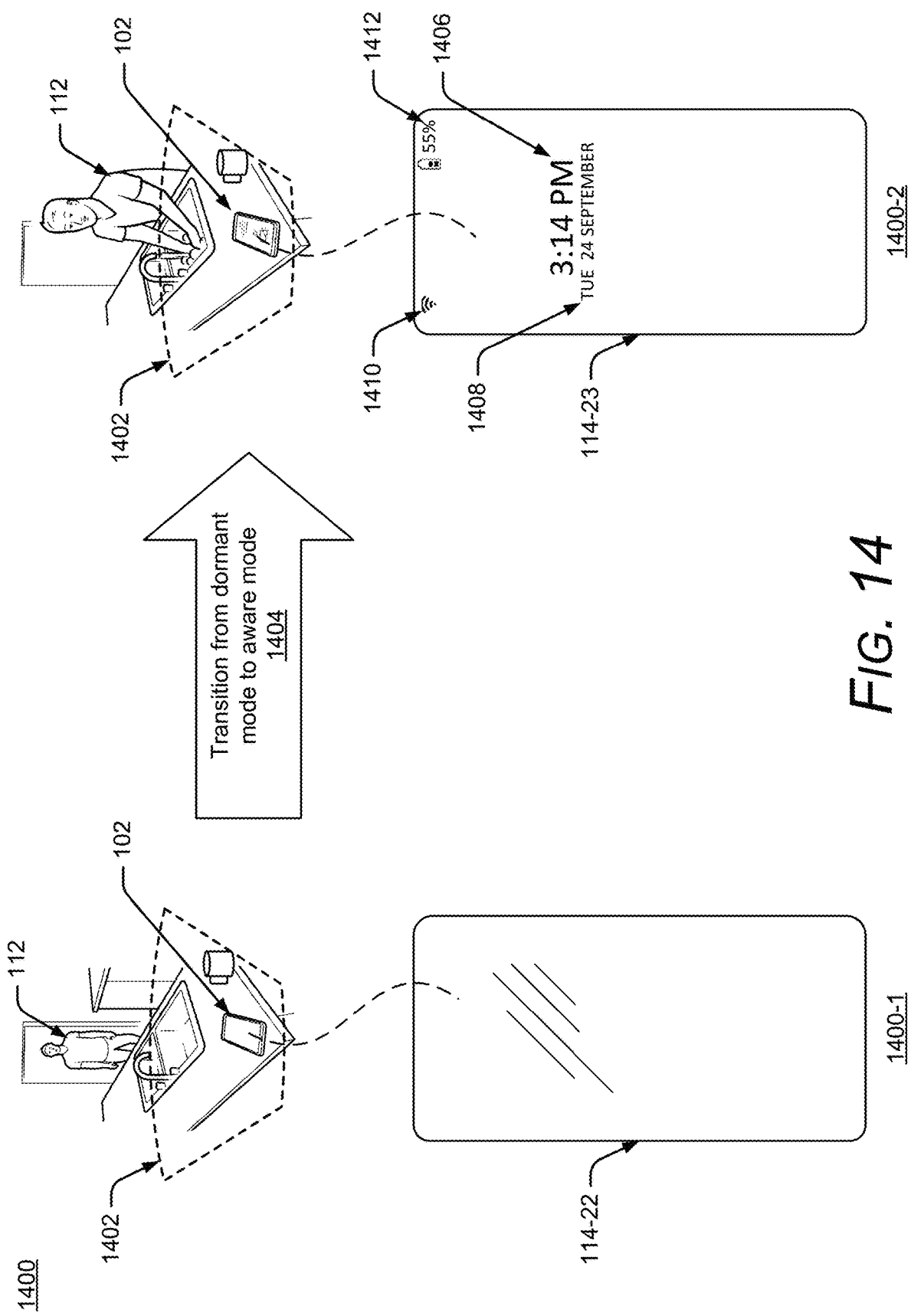
FIGS. 14-16 illustrate the electronic device of FIGS. 1 and 2 operating in multiple modes with examples of the visual elements that can be presented on the display in the different modes.
Figure 15:
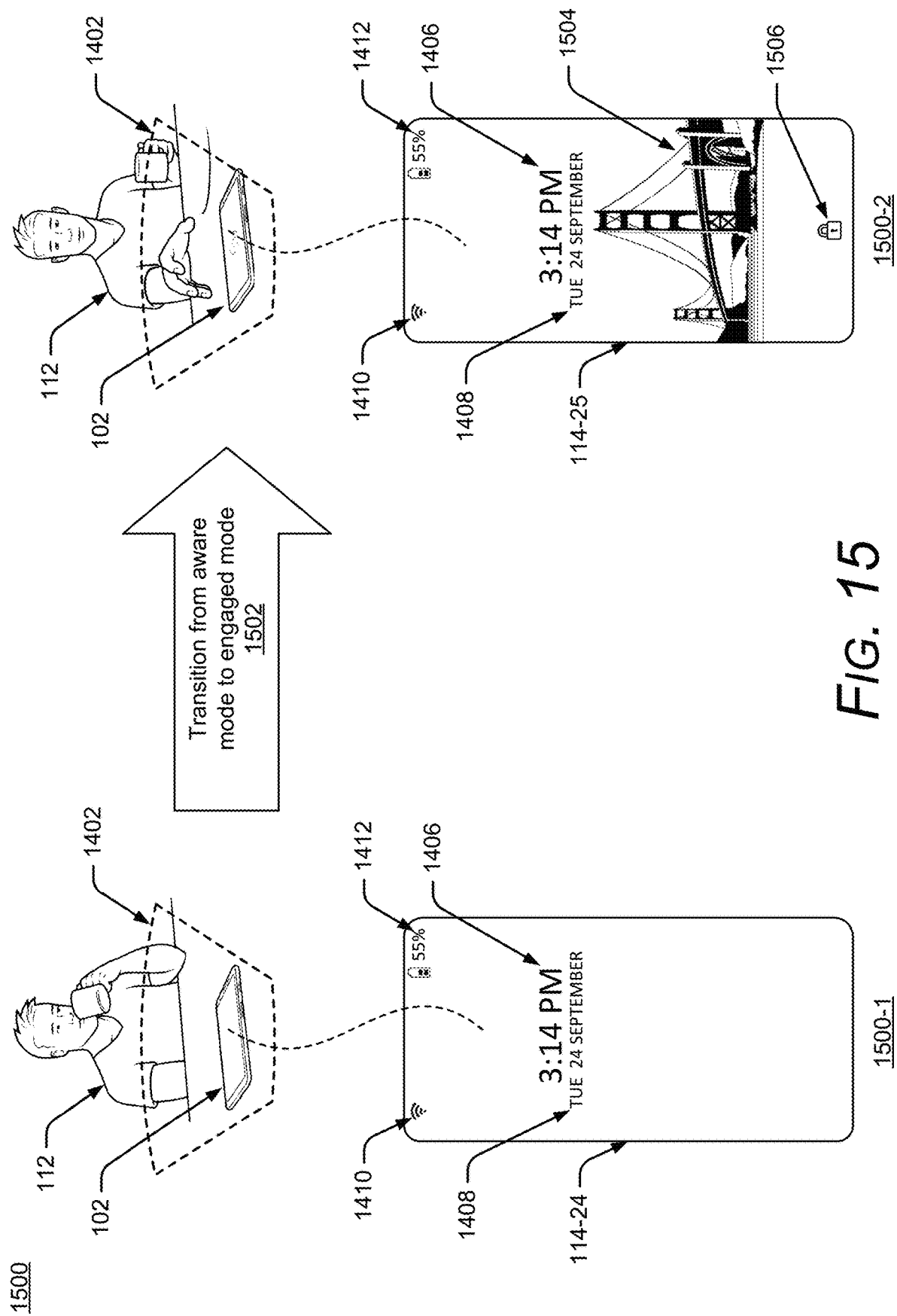
Figure 16:
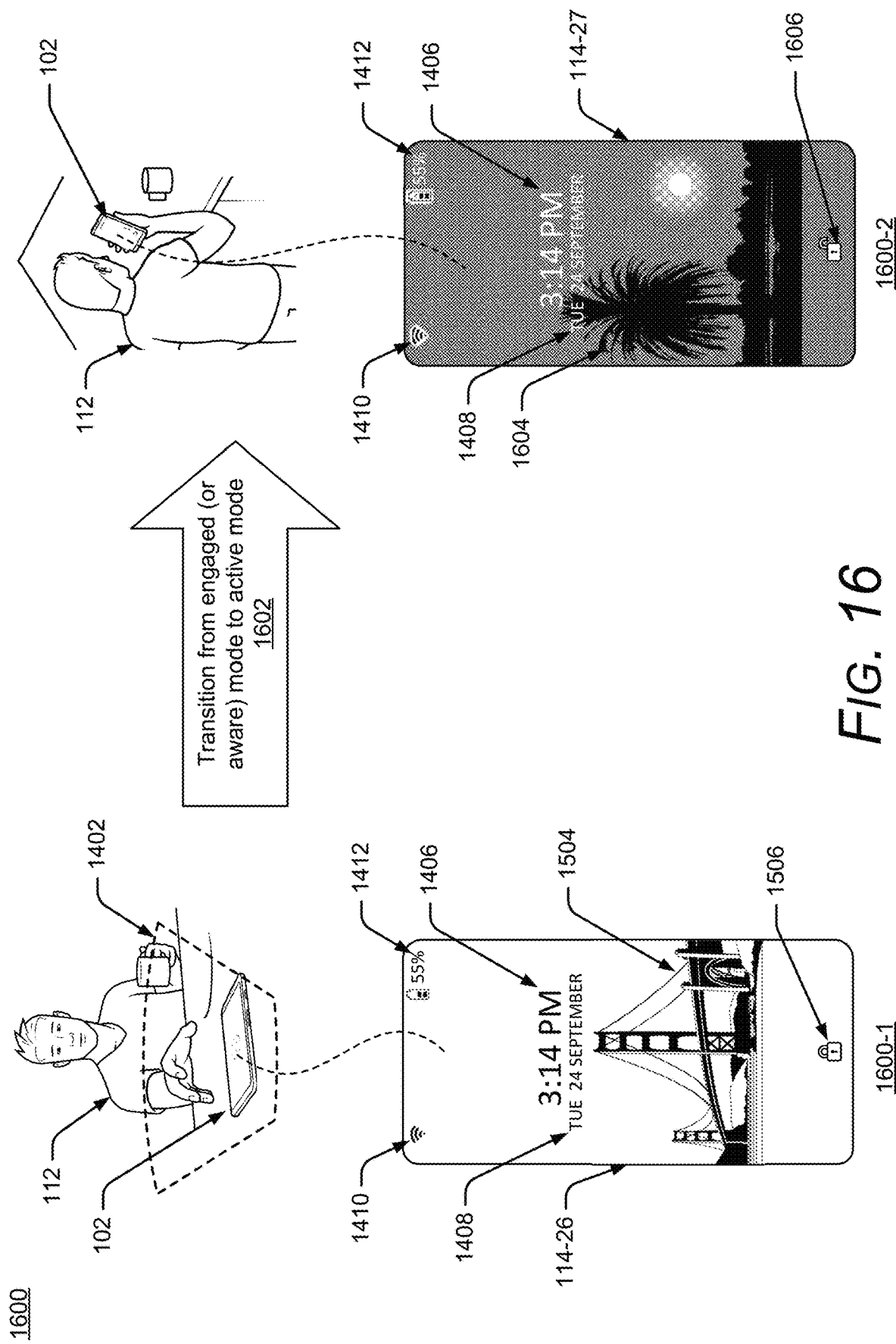

The user's location and movements can also be used to detect user actions that are categorized as indications of the user's intention to interact (or not interact) with the electronic device. For example, the electronic device may have access to a library (e.g., in a memory device) of actions that are categorized as indicators of a user's intent to interact or not interact with the device (e.g., reaching for the electronic device, turning or walking toward or away from the electronic device, leaning toward or looking at the electronic device). In some cases, the electronic device may also include machine-learning technology that can add, remove, or modify the actions stored in the library. Based on the detection of the user's presence, movements, and intention, the electronic device can cause the electronic device to enter and exit different modes of functionality and present different visual elements on a display, based on the modes. These modes can enable different functionalities for the electronic device, and help the user understand the mode the electronic device is operating in, and the services and functions that are available. FIGS. 14-16 illustrate the electronic device operating in the multiple modes and describe examples of the visual elements that can be presented on the display in the different modes.

For instance, when the user is not detected near the electronic device (e.g., within the radar field 110 or the recognition zone), the device operates in a dormant mode. In the dormant mode, the display (e.g., the display 114) may present fewer visual elements than in other modes, or no visual elements and the display may be on or off. When the electronic device determines the presence of the user within the recognition zone (e.g., using radar data, or one or more subsets of the radar data, from the radar system 104), the electronic device exits the dormant mode and enters an aware mode. In the aware mode, the display presents one or more visual elements that can indicate a status or functionality level of the electronic device.

While the electronic device is in the aware mode, the electronic device can detect a user action that is categorized as an indication of a user intent to interact with the electronic device. In response to detecting this user action, the electronic device can prepare an authentication system to perform an authentication process. In some implementations, when the electronic device detects the indication of the user's intent to interact, the electronic device also exits the aware mode and enters an engaged mode. In the engaged mode, the display presents additional or alternate visual elements that can indicate changes in the status or functionality level of the electronic device. The electronic device can also detect a trigger event and, based on the trigger event, cause the authentication system to authenticate the user. In response to the user being authenticated, the electronic device exits the aware or engaged mode and enters an active mode. In the active mode, the display presents additional or alternate visual elements that can indicate changes in the status or functionality level of the electronic device.

FIG. 14 illustrates an example 1400 of an electronic device transitioning from the dormant mode to the aware mode. A detail view 1400-1 shows the electronic device 102 in the dormant mode while the user 112 is outside of a recognition zone 1402. In this example, the recognition zone 1402 has a wedge shape, but as noted, the recognition zone 1402 can take any suitable shape or size. Continuing the example, in this case the display 114 is not presenting any visual elements in the dormant mode, as shown on an example display 114-22. In another detail view 1400-2, the user 112 is closer to the electronic device 102, which has determined that the user 112 has entered the recognition zone 1402. Based on this determination, the electronic device 102 exits the dormant mode and enters the aware mode, as shown by an arrow 1404.

In the detail view 1400-2, multiple visual elements are presented on an example display 114-23. For example, in the aware mode, the example display 114-23 presents a time-of-day element 1406 (a clock), a date element 1408, a connectivity status element 1410 (e.g., Wi-Fi, cellular, or other network connectivity), and a battery-level indicator element 1412 (including a graphical element and a percentage indicator). In the detail view 1400-2, the remainder of the example display 114-23 is blank. In some implementations, however, additional elements may be displayed, including a background image, such as a wallpaper or other image. Though not shown in FIG. 14, if the user 112 exits the recognition zone 1402, the electronic device 102 may stop displaying the visual elements and return to the dormant mode (immediately or after the user 112 has been outside the recognition zone 1402 for a selectable predetermined amount of time).

FIG. 15 illustrates an example 1500 of an electronic device transitioning from the aware mode to the optional engaged mode. A detail view 1500-1 shows the user 112 within the recognition zone 1402 and the electronic device 102 in the aware mode, as described with reference to FIG. 14, including displaying multiple visual elements (1406, 1408, 1410, 1412) on an example display 114-24. Another detail view 1500-2 shows the user 112 reaching for the electronic device 102. The electronic device 102 detects the reach (e.g., using one or more subsets of the radar data) as a user action that is an indication of a user intent to interact with the electronic device 102. In response to detecting this user action indicating intent, the electronic device 102 exits the aware mode and enters the engaged mode, as shown by an arrow 1502.

In the detail view 1500-2, additional visual elements are presented on an example display 114-25. For example, in the engaged mode, the example display 114-25 presents a background image 1504 (in this case, an image of the Golden Gate Bridge). The background image 1504 may have dynamic features that adjust with the context of the user, such as animation, or varying brightness or transparency levels that change depending on the distance or speed of the reach. While in the engaged mode, the electronic device 102 also prepares an authentication system to perform an authentication process (note that in some cases, the electronic device 102 does not enter the engaged mode and instead prepares the authentication system while in the aware mode, in response to the user action that indicates user intent). Accordingly, the example display 114-25 also presents a lock icon 1506, which indicates that full access to the electronic device 102 is unavailable until the user 112 is authenticated. In some implementations, additional visual elements may be displayed on the example display 114-25, and some or all of the visual elements presented on the example display 114-24 may cease being presented. Though not shown in FIG. 15, if the user 112 withdraws the reach gestures, the electronic device 102 may exit the engaged mode and return to the aware mode (immediately or after the reach has been withdrawn for a selectable predetermined amount of time).

FIG. 16 illustrates an example 1600 of an electronic device transitioning from the engaged mode to the active mode after the user 112 is authenticated (note that in some implementations, the electronic device can transition to the active mode from the aware mode). A detail view 1600-1 shows the user 112 within the recognition zone 1402 and the electronic device 102 in the engaged mode, as described with reference to FIG. 15, including displaying multiple visual elements on an example display 114-26 (1406, 1408, 1410, 1412, 1504, 1506). As noted with reference to FIG. 15, when the user reaches for the electronic device 102, the authentication system prepares to authenticate the user 112. In FIG. 16, another detail view 1600-2 shows that the user 112 has picked up the electronic device 102. The electronic device 102 determines that being picked up is a trigger event, as described above, and authenticates the user 112. When the user 112 is authenticated, the electronic device 102 exits the engaged mode (or the aware mode) and enters an active mode, as shown by an arrow 1602.

Additional visual elements associated with the active mode may also be presented on an example display 114-27, as shown in the detail view 1600-2. For example, in the active mode, the example display 114-27 continues to present the visual elements associated with the aware mode, but the background image 1504 (associated with the engaged mode) has changed to another background image 1604, a beach silhouette (note that as the background image 1604 has a different color scheme, some of the visual elements have changed contrast or color so that they remain visible to the user 112). Additionally, the engaged mode lock icon 1506 has transitioned to an unlock icon 1606, which indicates that the user 112 is authenticated. In some implementations, the unlock icon 1606 may be presented for a duration of time and then fade. While not illustrated in FIG. 16, additional visual elements may be displayed on the example display 114-27 after the unlock icon 1606 fades, such as an instruction (e.g., "Swipe or tap to open"), one or more application launch icons, or other visual elements available to the electronic device 102.

In some implementations, the user 112 may remain authenticated for as long as the user 112 remains within the recognition zone (e.g., the recognition zone 1402) or within another defined area within which the radar system can detect the presence of the user 112. In these implementations, the display 114 may remain powered and able to receive input and present content, or the screen may turn off to save battery power. Because the user 112 remains authenticated, even if the screen is off, the user can access the electronic device 102 by touching the screen, picking up the device, or another action, without having to be re-authenticated. In this way, the user's enjoyment and experience with the electronic device 102 can be improved while preserving battery power.

Further, the described progression between modes (e.g., from the dormant mode, through the aware and engaged modes, to authentication and the active mode), may instead run in an opposite direction. For example, when the electronic device 102 is in the active mode and the user 112 sets it down (e.g., another trigger event occurs), the electronic device may enter a locked state (e.g., de-authenticate the user 112), and/or place the electronic device 102 in the engaged or aware mode, as described above. Accordingly, if the user's hand remains near the electronic device 102 (e.g., remains in a "reach" position), the electronic device 102 may remain in the engaged mode. Conversely, if the user's hand is withdrawn, the electronic device 102 may enter the aware mode. Then, as noted, the electronic device 102 may remain in the aware mode while the user is in the recognition zone. During this progression between zones, the display 114 may present the visual elements described above for each zone, to indicate the changing status of the electronic device 102 to the user 112.

As noted, in some implementations, applications running on the electronic device 102 may be able to receive input through radar-based 3D gestures (radar gestures). In these cases, the radar system 104 may detect a reach by the user 112 and perform actions, based on the context of the electronic device 102. For example, when the electronic device is in any of the modes described above, the user 112 may receive a phone call, receive an alarm, alert, or notification, or play music through the electronic device. In these situations, the user may reach toward the electronic device to respond to the action. Thus, a reach may reduce or silence the ringer during an incoming call or an alarm. Further, if the user 112 notices an alert or notification is being displayed, and reaches toward the electronic device, the notification may be dismissed or become interactive. For example, upon detecting the user's reach, the electronic device may display the notification in a mode that allows the user to respond by dismissing or postponing the alert/notification, replying (in the case of a message or email notification), or in another manner. In some cases, the displayed notification may change color or size as well. In the example of the user 112 listening to music, a reach may cause the electronic device to present a control screen for the music player, so that the user can control the track, volume, or other parameter.

Some or all of these features may be available in different modes, and which features are available may be user-selectable. For example, the user 112 may allow volume silencing and music control in all modes but allow responding to alerts and notifications only in the active mode (e.g., when the user has been authenticated and has not left the recognition zone). Other combinations of features and permission levels may also be selected by the user.

Among the advantages of the described implementations, including implementations in which radar sensing is used to detect the presence of the user within a recognition zone, and further including implementations in which radar is used to detect user action that is categorized as an indication of a user intent to interact with the electronic device, either of which might alternatively be achievable using the on-device camera that is provided with most modern smartphones, is that the power usage of the radar facility is substantially less than the power usage of the camera facility, while the propriety of the results can often be better with the radar facility than with the camera facility. For example, using the radar facility described hereinabove, the desired user-state or user-intention detection can be achieved at average power ranging from single-digit milliwatts to just a few dozen milliwatts (e.g., 10 mW, 20 mW, 30 mW or 40 mW), even including the processing power for processing the radar vector data to make the determinations. At these low levels of power, it would be readily acceptable to have the radar facility in an always-on state. As such, for example, with the smartphone radar facility in the always-on state, the desired delightful and seamless experience presently described can still be provided for a user that has been sitting across the room from their smartphone for many hours.

In contrast, the optical cameras provided with most of today's smartphones typically operate at hundreds of milliwatts of power (e.g., an order of magnitude higher than 40 mW, which is 400 mW). At such power rates, optical cameras would be disadvantageous because they would significantly reduce the battery life of most of today's smartphones, so much so as to make it highly impractical, if not prohibitive, to have the optical camera in an always-on state. An additional advantage of the radar facility is that the field of view can be quite large, readily enough to detect a user walking up from any direction even when lying flat and face-up on a table (for many typical implementations in which the radar chip is facing outward in the same general direction as the selfie camera) and, furthermore, by virtue of its Doppler processing ability can be highly effective (especially at operating frequencies near 60 GHz) in detecting even relatively subtle movements of moving bodies from the variety of directions.

Additionally, the radar facility can operate in environments in which the performance of the camera facility is reduced or restricted. For example, in lower-light environments, the camera facility may have a reduced ability to detect shape or movement. In contrast, the radar facility performs as well in lower-light as in full light. The radar facility can also detect presence and gestures through some obstacles. For instance, if the smartphone is in a pocket or a jacket or pair of pants, a camera facility cannot detect a user or a gesture. The radar facility, however, can still detect objects in its field, even through a fabric that would block the camera facility. An even further advantage of using a radar facility over an onboard video camera facility of a smartphone is privacy, whereby a user can have the advantages of the herein described delightful and seamless experiences while at the same time not needing to be worried that there is a video camera taking video of them for such purposes.

Example Computing System

Figure 17:
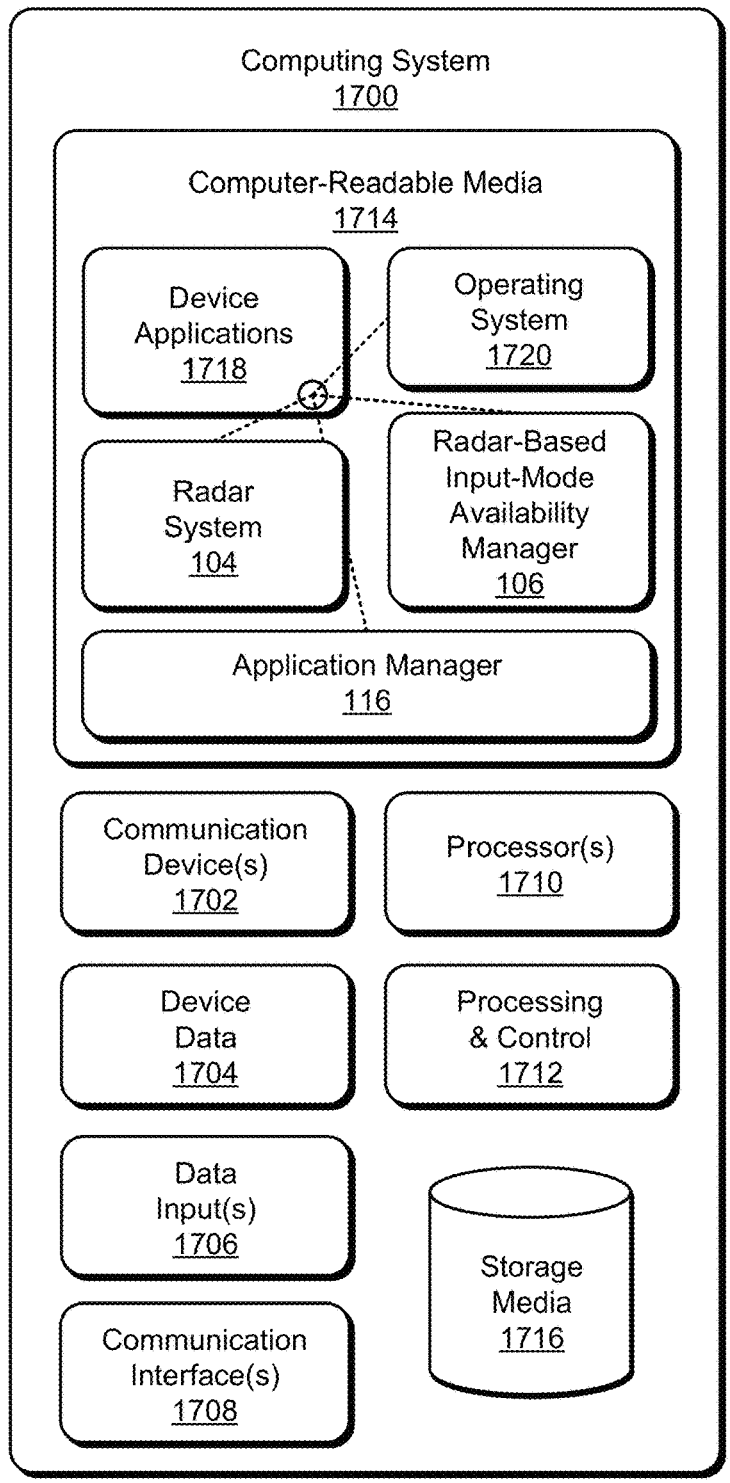
FIG. 17 illustrates an example computing system that can be implemented as any type of client, server, and/or electronic device as described with reference to FIGS. 1-16 to implement, or in which techniques may be implemented that enable, the input-mode notification for a multi-input mode.

FIG. 17 illustrates various components of an example computing system 1700 that can be implemented as any type of client, server, and/or electronic device as described with reference to the previous FIGS. 1-16 to implement an input-mode notification for a multi-input mode.

The computing system 1700 includes communication devices 1702 that enable wired and/or wireless communication of device data 1704 (e.g., radar data, authentication data, reference data, received data, data that is being received, data scheduled for broadcast, and data packets of the data). The device data 1704 or other device content can include configuration settings of the device, media content stored on the device, and/or information associated with a user of the device (e.g., an identity of a person within a radar field or customized gesture data). Media content stored on the computing system 1700 can include any type of radar, biometric, audio, video, and/or image data. The computing system 1700 includes one or more data inputs 1706 via which any type of data, media content, and/or inputs can be received, such as human utterances, interactions with a radar field (e.g., a radar gesture), touch inputs, user-selectable inputs or interactions (explicit or implicit), messages, music, television media content, recorded video content, and any other type of audio, video, and/or image data received from any content and/or data source.

The computing system 1700 also includes communication interfaces 1708, which can be implemented as any one or more of a serial and/or a parallel interface, a wireless interface, any type of network interface, a modem, and as any other type of communication interface. The communication interfaces 1708 provide a connection and/or communication links between the computing system 1700 and a communication network by which other electronic, computing, and communication devices communicate data with the computing system 1700.

The computing system 1700 includes one or more processors 1710 (e.g., any of microprocessors, controllers, or other controllers) that can process various computer-executable instructions to control the operation of the computing system 1700 and to enable techniques for, or in which can be implemented, the input-mode notification for a multi-input mode. Alternatively or additionally, the computing system 1700 can be implemented with any one or combination of hardware, firmware, or fixed logic circuitry that is implemented in connection with processing and control circuits, which are generally identified at 1712. Although not shown, the computing system 1700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures. Also not shown, the computing system 1700 can include one or more non-radar sensors, such as the non-radar sensors 108.

The computing system 1700 also includes computer-readable media 1714, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1700 can also include a mass storage media device (storage media) 1716.

The computer-readable media 1714 provides data storage mechanisms to store the device data 1704, as well as various device applications 1718 and any other types of information and/or data related to operational aspects of the computing system 1700. For example, an operating system 1720 can be maintained as a computer application with the computer-readable media 1714 and executed on the processors 1710. The device applications 1718 may include a device manager, such as any form of a control application, software application, signal-processing and control modules, code that is native to a particular device, an abstraction module, a gesture recognition module, and other modules. The device applications 1718 may also include system components, engines, modules, or managers to implement the input-mode notification for a multi-input mode, such as the radar system 104, the IMA manager 106, or the application manager 116. The computing system 1700 may also include, or have access to, one or more machine-learning systems.

Several examples are described below.

Example 1: An electronic device comprising: a display; a radar system, implemented at least partially in hardware, configured to: provide a radar field; sense reflections from a user in the radar field; analyze the reflections from the user in the radar field; and provide, based on the analysis of the reflections, radar data; one or more computer processors; and one or more computer-readable media having instructions stored thereon that, responsive to execution by the one or more computer processors, implement a radar-based input-mode availability manager configured to: determine that an application operating on the electronic device has a capability to receive radar gesture input; determine that the user is within a threshold distance of the electronic device; and responsive to the determination that the application operating on the electronic device has the capability to receive radar gesture input and that the user is within the threshold distance of the electronic device, cause the display to present an input-mode notification, the input-mode notification associated with the capability to receive the radar gesture input.

Example 2. The electronic device of example 1, wherein the input-mode notification is a visual element that appears at an edge of an active area of the display.

Example 3. The electronic device of example 1 or 2, wherein the input-mode notification is a visual element that appears at an edge of an active area of the display, the visual element comprising a portion of the active area of the display having: a visual property, in particular at least one of a luminosity, a color, a contrast, a shape, a saturation, a blur, or an opaqueness that is different from a visual property of another portion of the display that is near to the visual element; and a side that is adjacent to the edge of the active area of the display.

Example 4. The electronic device of example 3, wherein the visual property of the visual element varies from the side that is adjacent to the edge of the active area of the display to another side of the visual element.

Example 5: The electronic device of any of examples 1-4, wherein the radar-based input-mode availability manager is further configured to: obtain an orientation of content presented on the display; determine, based on the orientation of the content presented on the display, a direction of the radar gesture input that is used to interact with the content; and based on the direction of the radar gesture input that is used to interact with the content, cause the display to present the input-mode notification at a particular edge of the active area of the display that corresponds to the direction of the radar gesture input that is used to interact with the content.

Example 6. The electronic device of any of examples 1-5, wherein the radar-based input-mode availability manager is further configured to: detect a change in an orientation of the electronic device with respect to the user; and based on the change in the orientation of the electronic device with respect to the user, cause the display to present the input-mode notification on a different edge of the active display, effective to maintain an orientation of the input-mode notification with respect to the user.

Example 7. The electronic device of any of examples 1-6, wherein the radar-based input-mode availability manager is further configured to: determine that the application operating on the electronic device and having the capability to receive the radar gesture input is operating in an immersive mode; and responsive to determining the application operating on the electronic device and having the capability to receive the radar gesture input is operating in an immersive mode, cause the display to: present the input-mode notification for a presentation duration after the determination of the immersive mode; and responsive to the presentation duration ending, cease presenting the input-mode notification for a non-presentation duration.

Example 8. The electronic device of any of examples 1-7, wherein the determination that the application operating on the electronic device has a capability to receive radar gesture input, the determination that the user is within the threshold distance from the electronic device, and the presentation of the input-mode notification occur while the electronic device is in an unlocked state; or while the electronic device is in a locked state.

Example 9. The electronic device of any of examples 1-8, wherein radar-based input-mode availability manager is further configured to: determine that the user is interacting with the electronic device, wherein the determination that the user is interacting with the electronic device comprises a determination that the user is using touch input or a determination that the user has picked up the electronic device; responsive to the determination that the user is interacting with the electronic device, cause the display to cease presenting the input-mode notification; determine that the user has stopped interacting with the electronic device, wherein the determination that the user has stopped interacting with the electronic device comprises a determination that the user has stopped using touch input or a determination that the user has set down the electronic device; and responsive to the determination that the user has stopped interacting with the electronic device, cause the display to present the input-mode notification.

Example 10. The electronic device of any of examples 1-9, wherein the radar-based input-mode availability manager is further configured to: determine a background color of a region of the display on which the input-mode notification is displayed; and responsive to determination of the background color of the region of the display on which the input-mode notification is displayed, cause the display to present the input-mode notification in another color that is different from the background color, the different color effective to provide human-discernable contrast between the input-mode notification and the region of the display on which the input-mode notification is displayed.

Example 11. The electronic device of any of examples 1-10, wherein the radar-based input-mode availability manager is further configured to: determine at least one of an operational state, a screen state, a power state, or a functional mode of the electronic device, the operational state, the screen state, the power state, or the functional mode of the electronic device indicating that the input-mode notification has been presented for longer than a threshold duration; and responsive to the determination that the operational state, the screen state, the power state, and/or the functional mode of the electronic device indicates that the input-mode notification has been presented for longer than a threshold duration, cause the display to: present the input-mode notification at a different location; or cease presenting the input-mode notification for a duration of time; and responsive to the duration of time ending, present the input-mode notification for another duration of time.

Example 12. A method implemented in an electronic device that includes a display and a radar system, the method comprising: determining that an application operating on the electronic device has a capability to receive radar gesture input, the radar gesture input defined by radar data that is generated by the radar system; determining, based on one or more subsets of the radar data, that a user is within a threshold distance of the electronic device; and responsive to determining that the application operating on the electronic device has the capability to receive radar gesture input and that the user is within the threshold distance of the electronic device, providing an input-mode notification on the display of the electronic device, the input-mode notification associated with the capability to receive the radar gesture input.

Example 13. The method of example 12, wherein providing the input-mode notification further comprises providing a visual element that appears at an edge of an active area of the display.

Example 14. The method of example 12 or 13, wherein the input-mode notification is a visual element that appears at the edge of the active area of the display, the visual element comprising a portion of the active area of the display having: a visual property, in particular at least one of a luminosity, a color, a contrast, a shape, a saturation, a blur, or an opaqueness that is different from a visual property of another portion of the display that is near to the visual element; and a side that is adjacent to the edge of the active area of the display.

Example 15. The method of example 14, wherein the visual property of the visual element varies from the side that is adjacent to the edge of the active area of the display to another side of the visual element.

Example 16. The method of any of examples 12-15, further comprising: obtaining an orientation of content presented on the display; determining, based on the orientation of the content presented on the display, a direction of the radar gesture input that is used to interact with the content; and providing, based on the direction of the radar gesture input that is used to interact with the content, the input-mode notification on the edge of the active area of the display that corresponds to the direction of the radar gesture input that is used to interact with the content.

Example 17. The method of any of examples 12-16, further comprising: detecting a change in an orientation of the electronic device with respect to the user; and based on the change in the orientation of the electronic device with respect to the user, providing the input-mode notification on a different edge of the active display, effective to maintain an orientation of the input-mode notification with respect to the user.

Example 18. The method of any of examples 12-17, further comprising: determining that the application operating on the electronic device and having the capability to receive radar gesture input is operating in an immersive mode; and responsive to determining the application operating on the electronic device and having the capability to receive radar gesture input is operating in an immersive mode: providing the input-mode notification for a presentation duration after determining the immersive mode; and responsive to the presentation duration ending, cease providing the input-mode notification for a non-presentation duration.

Example 19. The method of any of examples 12-18, further comprising performing the steps of the method while the electronic device is in an unlocked state; or performing the steps of the method while the electronic device is in a locked state.

Example 20. The method of any of examples 12-19, further comprising: determining a background color of a region of the display on which the input-mode notification is displayed; and responsive to determining the background color of the region of the display on which the input-mode notification is displayed, providing the input-mode notification in another color that is different from the background color, the other color effective to provide human-discernable contrast between the input-mode notification and the region of the display on which the input-mode notification is displayed.

CONCLUSION

Although implementations of techniques for, and apparatuses enabling, an input-mode notification for a multi-input mode have been described in language specific to features and/or methods, it is to be understood that the subject of the appended claims is not necessarily limited to the specific features or methods described. Rather, the specific features and methods are disclosed as example implementations enabling the input-mode notification for a multi-input mode.

What is claimed is:

1. An electronic device comprising:
a display;
a radar system, implemented at least partially in hardware, configured to:
provide a radar field;
sense reflections from a user in the radar field;
analyze the reflections from the user in the radar field;
provide, based on the analysis of the reflections, radar data; and
determine, irrespective of receiving radar-gesture input and based on the radar data, whether the user is within a threshold distance of the electronic device;
one or more computer processors; and
one or more non-transitory computer-readable media having instructions stored thereon that, responsive to execution by the one or more computer processors, implement a radar-based input-mode availability manager configured to:
determine whether an application that has a capability to receive radar gesture input is operating on the electronic device; and
irrespective of receiving radar-gesture input and responsive to a determination that the application that has the capability to receive radar gesture input is operating on the electronic device and a determination that the user is within the threshold distance of the electronic device, cause the display to present an input-mode notification, the input-mode notification associated with the capability to receive the radar gesture input.

2. The electronic device of claim 1, wherein the input-mode notification is a visual element that appears at an edge of an active area of the display.

3. The electronic device of claim 1, wherein the input-mode notification is a visual element that appears at an edge of an active area of the display, the visual element comprising a portion of the active area of the display having:
a visual property, in particular at least one of a luminosity, a color, a contrast, a shape, a saturation, a blur, or an opaqueness that is different from a visual property of another portion of the display that is near to the visual element; and
a side that is adjacent to the edge of the active area of the display.

4. The electronic device of claim 1, wherein the radar-based input-mode availability manager is further configured to:
obtain an orientation of content presented on the display;
determine, based on the orientation of the content presented on the display, a direction of the radar gesture input that is used to interact with the content; and
based on the direction of the radar gesture input that is used to interact with the content, cause the display to present the input-mode notification at a particular edge of the active area of the display that corresponds to the direction of the radar gesture input that is used to interact with the content.

5. The electronic device of claim 1, wherein the radar-based input-mode availability manager is further configured to:
detect a change in an orientation of the electronic device with respect to the user; and
based on the change in the orientation of the electronic device with respect to the user, cause the display to present the input-mode notification on a different edge of the active display, effective to maintain an orientation of the input-mode notification with respect to the user.

6. The electronic device of claim 1, wherein the radar-based input-mode availability manager is further configured to:
   determine that the application operating on the electronic device and having the capability to receive the radar gesture input is operating in an immersive mode; and
   responsive to determining the application operating on the electronic device and having the capability to receive the radar gesture input is operating in an immersive mode, cause the display to:
      present the input-mode notification for a presentation duration after the determination of the immersive mode; and
      responsive to the presentation duration ending, cease presenting the input-mode notification for a non-presentation duration.

7. The electronic device of claim 1, wherein the determination that the application operating on the electronic device has a capability to receive radar gesture input, the determination that the user is within the threshold distance from the electronic device, and the presentation of the input-mode notification occur:
   while the electronic device is in an unlocked state; or
   while the electronic device is in a locked state.

8. The electronic device of claim 1, wherein the radar-based input-mode availability manager is further configured to:
   determine that the user is interacting with the electronic device, wherein the determination that the user is interacting with the electronic device comprises a determination that the user is using touch input or a determination that the user has picked up the electronic device;
   responsive to the determination that the user is interacting with the electronic device, cause the display to cease presenting the input-mode notification;
   determine that the user has stopped interacting with the electronic device, wherein the determination that the user has stopped interacting with the electronic device comprises a determination that the user has stopped using touch input or a determination that the user has set down the electronic device; and
   responsive to the determination that the user has stopped interacting with the electronic device, cause the display to present the input-mode notification.

9. The electronic device of claim 1, wherein the radar-based input-mode availability manager is further configured to:
   determine a background color of a region of the display on which the input-mode notification is displayed; and
   responsive to determination of the background color of the region of the display on which the input-mode notification is displayed, cause the display to present the input-mode notification in another color that is different from the background color, the different color effective to provide human-discernable contrast between the input-mode notification and the region of the display on which the input-mode notification is displayed.

10. The electronic device of claim 1, wherein the radar-based input-mode availability manager is further configured to:
    determine at least one of an operational state, a screen state, a power state, or a functional mode of the electronic device, the operational state, the screen state, the power state, or the functional mode of the electronic device indicating that the input-mode notification has been presented for longer than a threshold duration; and
    responsive to the determination that the operational state, the screen state, the power state, and/or the functional mode of the electronic device indicates that the input-mode notification has been presented for longer than a threshold duration, cause the display to:
       present the input-mode notification at a different location; or
       cease presenting the input-mode notification for a duration of time; and
          responsive to the duration of time ending, present the input-mode notification for another duration of time.

11. The electronic device of claim 1, wherein the radar system determines whether the user is within a threshold distance of the electronic device using the radar-based input-mode availability manager.

12. The electronic device of claim 1, wherein the user being within a threshold distance of the electronic device does not comprise radar-gesture input.

13. A method implemented in an electronic device that includes a display and a radar system, the method comprising:
    determining whether an application that has a capability to receive radar gesture input is operating on the electronic device, the radar gesture input defined by radar data that is generated by the radar system;
    determining, by the radar system, based on one or more subsets of the radar data and irrespective of receiving radar-gesture input, whether a user is within a threshold distance of the electronic device; and
    irrespective of receiving radar-gesture input and responsive to determining that the application that has a capability to receive radar gesture input is operating on the electronic device and that the user is within the threshold distance of the electronic device, providing an input-mode notification on the display of the electronic device, the input-mode notification associated with the capability to receive the radar gesture input.

14. The method of claim 13, wherein providing the input-mode notification further comprises providing a visual element that appears at an edge of an active area of the display.

15. The method of claim 13, wherein the input-mode notification is a visual element that appears at the edge of the active area of the display, the visual element comprising a portion of the active area of the display having:
    a visual property, in particular at least one of a luminosity, a color, a contrast, a shape, a saturation, a blur, or an opaqueness that is different from a visual property of another portion of the display that is near to the visual element; and
    a side that is adjacent to the edge of the active area of the display, and wherein the visual property of the visual element varies from the side that is adjacent to the edge of the active area of the display to another side of the visual element.

16. The method of claim 13, further comprising:
    obtaining an orientation of content presented on the display;
    determining, based on the orientation of the content presented on the display, a direction of the radar gesture input that is used to interact with the content; and providing, based on the direction of the radar gesture input that is used to interact with the content, the input-mode notification on the edge of the active area of the display that corresponds to the direction of the radar gesture input that is used to interact with the content.

17. The method of claim 13, further comprising:
detecting a change in an orientation of the electronic device with respect to the user; and
based on the change in the orientation of the electronic device with respect to the user, providing the input-mode notification on a different edge of the active display, effective to maintain an orientation of the input-mode notification with respect to the user.

18. The method of claim 13, further comprising:
determining that the application operating on the electronic device and having the capability to receive radar gesture input is operating in an immersive mode; and
responsive to determining the application operating on the electronic device and having the capability to receive radar gesture input is operating in an immersive mode:
providing the input-mode notification for a presentation duration after determining the immersive mode; and
responsive to the presentation duration ending, cease providing the input-mode notification for a non-presentation duration.

19. The method of claim 13, further comprising:
determining a background color of a region of the display on which the input-mode notification is displayed; and
responsive to determining the background color of the region of the display on which the input-mode notification is displayed, providing the input-mode notification in another color that is different from the background color, the other color effective to provide human-discernable contrast between the input-mode notification and the region of the display on which the input-mode notification is displayed.

20. The method of claim 13, wherein the radar system determines whether the user is within a threshold distance of the electronic device using another component of the electronic device.

* * * * *